US012624191B2

(12) United States Patent
Jurewicz et al.

(10) Patent No.: US 12,624,191 B2
(45) Date of Patent: May 12, 2026

(54) POLYMERIC OPAL

(71) Applicant: UNIVERSITY OF SURREY, Guildford (GB)

(72) Inventors: Izabela Jurewicz, Guildford (GB); Alan Dalton, Guildford (GB)

(73) Assignee: UNIVERSITY OF SURREY, Guildford (GB)

(*) Notice: Subject to any disclaimer, the term of this patent is extended or adjusted under 35 U.S.C. 154(b) by 850 days.

(21) Appl. No.: 17/311,320

(22) PCT Filed: Dec. 5, 2019

(86) PCT No.: PCT/GB2019/053435

§ 371 (c)(1),
(2) Date: Jun. 5, 2021

(87) PCT Pub. No.: WO2020/115486

PCT Pub. Date: Jun. 11, 2020

(65) Prior Publication Data

US 2022/0017719 A1 Jan. 20, 2022

(30) Foreign Application Priority Data

Dec. 5, 2018 (GB) ...................................... 1819852

(51) Int. Cl.

| | |
|---|---|
| ***C08K 3/04*** | (2006.01) |
| ***B82Y 20/00*** | (2011.01) |
| ***B82Y 40/00*** | (2011.01) |
| ***C08F 2/22*** | (2006.01) |

(52) U.S. Cl.
CPC ................ *C08K 3/042* (2017.05); *C08F 2/22* (2013.01); *B82Y 20/00* (2013.01); *B82Y 40/00* (2013.01)

(58) Field of Classification Search
None
See application file for complete search history.

(56) References Cited

U.S. PATENT DOCUMENTS

2006/0292344 A1* 12/2006 Winkler .................. C04B 20/12
428/141
2013/0288035 A1* 10/2013 Baumberg ............ B29C 55/023
428/221

FOREIGN PATENT DOCUMENTS

| | | |
|---|---|---|
| CN | 103 225 103 A | 10/2014 |
| CN | 108 912 254 A | 11/2018 |
| KR | 2013-0051231 A | 5/2013 |
| WO | WO 2014154148 * | 10/2014 |

OTHER PUBLICATIONS

Machine translation of Yanlin et al. WO 2014154148 (Year: 2014).*
Pursianinen et al (2007) [O. L. J. Pursianinen, J. J. Baumberg, H. Winkler, B. Viel, P. Spahn, T. Ruhl, Optics Express 15, 9553 (2007)] (Year: 2007).*
International Search Report and Written Opinion for PCT International Patent Application No. PCT/GB2019/053435, dated Mar. 17, 2020, 11 pages.
Chiappini et al., "Tailoring the Optical Properties by Colloidal Systems", 2012 14$^{th}$ International Conference on Transparent Optical Networks (ICTON 2012): Coventry, United Kingdom, Jul. 2-5, 2012, IEEE Jul. 2, 2021, pp. 1-4, DOI: 10/1109/ICTON.2012.6253860.
Foreign Office Action issued in Canada Patent Application No. 3,121,737, dated Oct. 28, 2024, 6 pages.
Finlayson, Chris E. et al., "Polymer opals as novel photonic materials", Polym. Int., 62, pp. 1403-1407, DOI: https://doi.org/10.1002/pi.4582, Sep. 4, 2013 (Sep. 4, 2013).
Encyclopedia of Polymer Science and Technology, DOI: 10.1002/0471440264; Copyright 2011 John Wiley & Sons, 27 pages (2011).
National Aeronautics and Space Administration, Phases of Matter, Glen Research Center, https:www.grc.nasa.gov/www/k-12/airplane/state.html#, 2 pages (2025).

* cited by examiner

*Primary Examiner* — Robert T Butcher
(74) *Attorney, Agent, or Firm* — Squire Patton Boggs (US) LLP

(57) ABSTRACT

The present disclosure provides a polymeric opal comprising a polymer and an additive. The additive comprises a two-dimensional (2D) material and/or a carbon nanotube and the weight ratio of the polymer to the additive is between 100:0.001 and 00:0.1.

24 Claims, 11 Drawing Sheets

POLYMERIC OPAL

CROSS-REFERENCE TO RELATED APPLICATIONS

This application is a 35 U.S.C. § 371 application of International Application No. PCT/GB2019/053435, filed on Dec. 5, 2019, which claims the benefit of European Patent Application GB 1819852.3, filed on Dec. 5, 2018, the entireties of which are hereby incorporated by reference.

The present invention relates to a polymeric opal. The invention extends to a method of producing the polymeric opal and various uses of the polymeric opal.

Nature has presented us with incredible examples of functional materials. Structural colour, as found in butterfly wings or opal gem stones, is particularly fascinating. Mimicking such behaviour using synthetic photonic crystals consisting of highly ordered assemblies of monosize colloidal particles is promising for a range of novel and emerging applications. One of the major limiting factors for colloidal photonic crystals requiring colour perceptibility, is their opaque nature. The origin of the opacity is structural disorder causing strong incoherent scattering that generates diffuse light as well as a low refractive index contrast.

The present invention arises from the inventors' attempts in producing synthetic colloidal photonic crystals.

In accordance with a first aspect of the invention, there is provided a polymeric opal comprising a polymer and an additive, wherein the additive comprises a two-dimensional (2D) material and/or a carbon nanotube and the weight ratio of the polymer to the additive is between 100:0.001 and 100:0.1.

Advantageously, the inventors have found that polymeric opals as defined in the first aspect are mechanically robust, free-standing, flexible and thick synthetic opals containing an additive locked in a colloidal polymer crystal lattice. In particular, the additive markedly increases iridescence and reduces deleterious scattering producing a strong angle-dependent structural colour and a stopband that can be reversibly shifted across the visible spectrum.

For the graphene and polymers used in the examples, a weight ratio of between 100:0.001 and 100:01 corresponds to a volumetric ratio of between about 100:0.0005 and 100:005.

The weight ratio of the polymer to the additive may be between 100:0.002 and 100:0.08, more preferably between 100:0.004 and 100:0.06, between 100:0.006 and 100:0.04 or between 100:0.007 and 100:0.02, and most preferably between 100:0.008 and 100:0015 or between 100:0.009 and 100:0.0125.

Alternatively, or additionally, the volumetric ratio of the polymer to the additive may be between 100:0.001 and 100:001, more preferably between 100:0.002 and 100:0.08 or between 100:0.003 and 100:0.007, and most preferably between 100:0.004 and 100:0.006.

The additive may consist of a 2D material.

The term "2D material" can refer to a material with a thickness of a few nanometres or less. Accordingly, the material could have a thickness of 10 nm or less, 5 nm or less or 2 nm or less. The 2D material may comprise of a single layer of atoms. It may be appreciated that a single layer could comprise multiple strata. For instance, molybdenum disulphate comprises a plane of molybdenum ions sandwiched between two planes of sulphide ions. Alternatively, all of the carbon atoms in a layer of graphene are disposed in the same plane, so a single layer of graphene may be viewed as having one stratum. Accordingly, a single layer could comprise between 1 and 5 strata, preferably between 1 and 3 strata. An atom within the single layer of atoms may be covalently bonded to one or more other atoms within the single layer of atoms. In embodiments where the single layer comprises multiple strata, an atom may be covalently bonded to one or more atoms in a different stratum within the single layer of atoms. However, an atom within the single layer of atoms may not be covalently bonded to a further atom with is not in the single layer of atoms.

Accordingly, the 2D material may comprise a plurality of layers. The plurality of layers may be adjacent to each other. The plurality of layers may not be connected by covalent bonds.

The 2D material preferably comprises a plurality of particles.

The plurality of particles may have a mean thickness of less than 50 nm, less than 40 nm, less than 30 nm or 2 less than 0 nm, more preferably less than 10 nm, less than 7.5 nm, less than 5 nm or less than 2.5 nm, and most preferably less than 2 nm, less than 1.5 nm or less than 1 nm. Alternatively, or additionally, the plurality of particles may have a mean number of layers between 1 and 20, more preferably between 1 and 15 or between 1 and 10 and most preferably between 1 and 5.

The plurality of particles may comprise a largest lateral dimension with a mean size of less than 30 μm, less than 20 μm, less than 15 μm or less than 10 μm, more preferably a mean size of less than 5 μm or less than 4 μm, and most preferably less than 3.5 μm. The plurality of particles may comprise a largest lateral dimension with a mean size of at least 20 nm, at least 30 nm or at least 40 nm, more preferably a mean size of at least 50 nm or at least 75 nm, and most preferably at least 100 nm. The plurality of particles may comprise a largest lateral dimension with a mean size of between 20 nm and 20 μm, between 30 nm and 15 μm or between 40 nm and 10 μm, more preferably a mean size of between 50 nm and 5 μm or between 75 nm and 4 μm, and most preferably between 100 nm and 3.5 μm. It may be appreciated that the lateral dimension is a dimension perpendicular to the thickness of the particle.

The 2D material may be selected from the group consisting of graphene, graphene oxide (GO), hexagonal boron nitride (h-BN) and a transition metal dichalcogenide. It may be appreciated that a transition metal dichalcogenide has general formula $MX_2$ where M is a transition metal and X is a chalogen. The transition metal dichalcogenide may be molybdenum disulphide ($MoS_2$), tungsten disulphite ($WS_2$), molybdenum diselenide ($MoSe_2$), tungsten diselenide ($WSe_2$) or molybdenum(IV) telluride ($MoTe_2$ The additive may consist of a plurality of carbon nanotubes. The or each carbon nanotube may be a single-wall carbon nanotube, a double-wall carbon nanotube or multi-wall carbon nanotube.

Preferably, the polymeric opal comprises a surfactant.

The surfactant preferably comprises a non-ionic surfactant. Accordingly, the non-ionic surfactant may comprise a structure of formula (I):

$$R^1\text{-}R^2 \qquad \text{(I)}$$

wherein $R^1$ is a hydrophilic group; and $R^2$ is a hydrophobic group.

$R^1$ may be an optionally substituted $C_5$-$C_{10}$ aryl, optionally substituted 5 to 10 membered heteroaryl or a $C_{1-30}$ alkyl, alkyenyl or alkynyl group. The optionally substituted $C_5$-$C_{10}$ aryl may be an optionally substituted phenyl. Alternatively, $R^1$ may be a $C_{10-20}$ alkyl, alkyenyl or alkynyl group.

The aryl or heteroaryl may be substituted with a $C_1$-$C_{20}$ straight or branched chain alkyl or a halogen. Preferably, the aryl or heteroaryl is substituted with a $C_2$-$C_{15}$ straight or branched chain alkyl, and most preferably with a $C_3$-$C_{10}$ straight or branched chain alkyl.

In a preferred embodiment, $R^1$ is

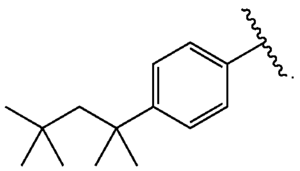 [SMILES: *c1ccc(C(C)(C)CC(C)(C)C)cc1]

Preferably, $R^2$ comprises oxygen, and more preferably

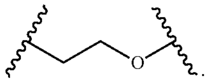 [SMILES: *CCO*]

$R^2$ preferably is

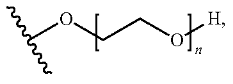

wherein n is an integer between 1 and 50. The non-ionic surfactant may comprise a plurality of molecules of formula (I). Accordingly, n may vary within the plurality of molecules. Preferably, the mean value of n is between 2 and 40 or between 3 and 30, and most preferably is between 5 and 15 or between 7.5 and 12.5.

Alternatively, $R^2$ may be

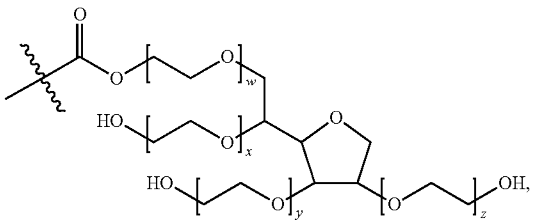

wherein w, x, y and z are all independently integers between 1 and 20. Preferably the sum of w, x, y and z is equal to 20.

Accordingly, in one embodiment, the non-ionic surfactant may comprise

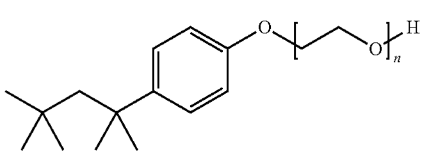

and/or a polysorbate. The non-ionic surfactant may comprise triton X-100 and/or polysorbate 80, and is preferably comprises triton X-100. The volumetric ratio of the polymer to the surfactant may be between 100:0.0001 and 100:2, more preferably between 100:0.001 and 100:1 or between 100:0.01 and 100:0.75, and most preferably between 100:04 and 100:06.

The volumetric ratio of the polymer to the non-ionic surfactant may be between 100:0.0001 and 100:2, more preferably between 100:0.001 and 100:1 or between 100:001 and 100:0.75, and most preferably between 100:04 and 100:06.

The polymer preferably has a dry glass transition temperature ($T_g$) between ° C. and 100° C., more preferably between 5° C. and 75° C. or between 10° C. and 50° C., and most preferably between 15° C. and 47.5° C., between 20° C. and 45° C., between 22.5° C. and 42.5° C. or between 25° C. and 35° C. It may be appreciated that the $T_g$ may be determined as described in the examples.

It may be appreciated that due to the incorporation of surfactant, the opal may have a different dry glass transition temperature ($T_g$) to the polymer. Preferably, the opal has a $T_g$ between −20° C. and 120° C., more preferably between −15° C. and 95° C. or between −10° C. and 70° C., and most preferably between −5° C. and 67.5° C., between ° C. and 65° C., between 2.5° C. and 62.5° C. or between 5° C. and 55° C.

The polymer preferably comprises a plurality of particles.

Preferably, the plurality of polymer particles have an average particle size of between 50 nm and 1,000 nm or between 100 nm and 500 nm, more preferably between 150 nm and 450 nm or between 200 nm and 400 nm, and most preferably is between 210 nm and 380 nm, between 220 nm and 360 nm, between 230 nm and 340 nm, between 240 nm and 320 nm or between 250 nm and 300 nm. The particle size may be determined using a dynamic light scattering technique and/or by atomic force microscopy.

Preferably, the plurality of polymer particles are substantially monodisperse.

The plurality of polymer particles may be viewed as being substantially monodisperse if they have a Polydispersity Index (PDI) from dynamic light scattering (DLS) of less than 0.4, more preferably less than 0.3 or less than 0.2, and most preferably less than 0.1 or less than 0.05. The calculation of the PDI from DLS is provided in the ISO standard document ISO 22412:2017.

Alternatively, or additionally, the plurality of polymer particles may be viewed as being substantially monodisperse if they have a percentage polydispersity of less than 30%, more preferably less than 25%, and most preferably less than 20%. The percentage polydispersity is derived from the PDI.

Preferably, the plurality of polymer particles define a close packed structure, and more preferably a hexagonal close packed structure, within the polymeric opal.

The plurality of polymer particles may be stabilised by a further surfactant. Suitable surfactants for use in stabilising polymer particles are well known in the art. The further surfactant could be a non-ionic or an anionic surfactant. For instance, examples of surfactants used for emulsion polymerisation include alkyldiphenyloxide disulfonate, alkylphenol ethoxylate, sodium lauryl sulphate and sodium lauryl ether sulphate.

Preferably, the polymer comprises a carboxylic acid group.

The polymer may be a copolymer made from a plurality of monomers. Preferably, the polymer is a random copolymer made from a plurality of monomers.

The plurality of monomers may comprise a first monomer comprising a carboxylic acid group. The first monomer is preferably an unsaturated carboxylic acid. The first monomer may be methacrylic acid (MAA) or acrylic acid (AA).

The molar percentage of the first monomer within the plurality of monomers may be between 0.5% and 20%, more preferably between 1% and 10% or between 1.5% and 7.5%, and most preferably is between 2% and 5% or between 2.5% and 4%.

Preferably, the plurality of monomers comprise a second monomer comprising an ester group. The second monomer is preferably an unsaturated ester. Accordingly, the second monomer may comprise a compound of formula (II):

(II)

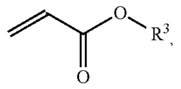

wherein $R^3$ is a $C_1$-$C_{20}$ straight or branched chain alkyl.

Preferably, $R^3$ is a $C_1$-$C_{15}$ straight or branched chain alkyl, more preferably a $C_1$-$C_{10}$ straight or branched chain alkyl and most preferably a $C_1$-$C_5$ straight or branched chain alkyl. Accordingly, $R^3$ may be methyl, ethyl, propyl, butyl or propyl. In a preferred embodiment, $R^3$ is butyl. Accordingly, the second monomer may be butyl acrylate (BA).

The molar percentage of the second monomer within the plurality of monomers may be between 1% and 95%, more preferably between 5% and 80% or between 10% and 70%, and most preferably is between 25% and 60%, between 35% and 50% or between 40% and 45%.

In addition to, or instead of, the second monomer, the plurality of monomers may comprise a third monomer comprising an ester group and/or a $C_5$-$C_{10}$ aryl group. The third monomer is preferably an unsaturated ester. Accordingly, the third monomer may comprise a compound of formula (III):

(III)

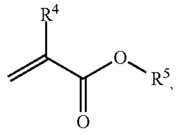

wherein $R^4$ and $R^5$ are each independently a $C_1$-$C_{20}$ straight or branched chain alkyl. Preferably, $R^4$ and $R^5$ are each independently a $C_1$-$C_{15}$ straight or branched chain alkyl, more preferably a $C_1$-$C_{10}$ straight or branched chain alkyl and most preferably a $C_1$-$C_5$ straight or branched chain alkyl. Accordingly, $R^4$ and $R^5$ may each independently be methyl, ethyl, propyl, butyl or propyl. In a preferred embodiment, $R^4$ and $R^5$ are each methyl. Accordingly, the third monomer may be methyl methacrylate (MMA). Alternatively, the third monomer may be 2-(acetoacetoxy)ethyl methacrylate (AAEM) or styrene.

The molar percentage of the third monomer within the plurality of monomers may be between 1% and 95%, more preferably between 5% and 90% or between 10% and 80%, and most preferably is between 20% and 70%, between 40% and 65% or between 50% and 60%.

Accordingly, in some embodiments, the first monomer is MAA, the second monomer is BA and the third monomer is MMA. In this embodiment, the polymer may further be made from a fourth monomer which may be AAEM.

In an alternative embodiment, the first monomer is AA, the second monomer is BA and the third monomer is styrene.

Preferably, the polymeric opal comprises an interstitial liquid. Preferably, the interstitial liquid does not induce swelling of the polymeric opal. The interstitial liquid may comprise water, an alcohol or an amine. The alcohol may comprise a diol. The amine may comprise a diamine, and preferably comprises 1,6-hexanediamine. Advantageously, the colour of the opal varies depending upon the interstitial liquid used.

The interstitial liquid may comprise at least 0.5 wt % of the polymeric opal, more preferably at least 2 wt %, at least 4 wt % or at least 6 wt % of the polymeric opal, and most preferably at least 7 wt %, at least 8 wt % or at least 8.5 wt % of the polymeric opal. The interstitial liquid may comprise less than 30 wt % of the polymeric opal, more preferably less than 20 wt %, less than 17.5 wt % or less than 15 wt % of the polymeric opal, and most preferably less than 12.5 wt %, less than 10 wt % or less than 9.5 wt % of the polymeric opal. The interstitial liquid may comprise between 0.5 wt % and 30 wt % of the polymeric opal, more preferably between 2 wt % and 20 wt %, between 4 wt % and 17.5 wt % or between 6 wt % and 15 wt % of the polymeric opal, and most preferably between 7 wt % and 12.5 wt %, between 8 wt % and 10 wt % or between 8.5 wt % and 9.5 wt % of the polymeric opal.

The polymeric opal may comprise a polymer coating. The polymer coating may be configured to modify the rate of evaporation of the interstitial liquid. Advantageously, this allows the time that it takes the polymeric opal to lose its colour to be modified, enabling it to be used as a time temperature indicator (TTI). Alternatively, the polymer coating may be configured to prevent evaporation of the interstitial liquid. Advantageously, this ensures that the colour of the polymeric opal is maintained allowing it to be used decoratively, for instance in jewellery. The polymeric coating may comprise a polymeric resin.

Preferably, the polymeric opal exhibits a stopband. Preferably, the polymeric opal exhibits the stopband at a wavelength between 200 nm and 1000 nm or between 300 and 800 nm, and more preferably between 390 nm and 700 nm. In some embodiments, the polymeric opal may exhibit the stopband at a wavelength between 400 nm and 650 nm, between 450 nm and 600 nm, between 500 nm and 550 nm or between 510 nm and 530 nm.

The inventors also believe that their method of producing the polymeric opal is novel and inventive.

Accordingly, in accordance with a second aspect, there is provided a method of producing a polymeric opal, the method comprising:

- providing a dispersion comprising a polymer and an additive in a solvent, wherein the additive comprises a two-dimensional (2D) material and/or a carbon nanotube and the volumetric ratio of the polymer to the additive is between 100:0.0001 and 100:01;
- evaporating the solvent at a rate whereby evaporation of the solvent dominates over diffusion and sedimentation of the polymer and the additive to thereby form a polymeric opal.

Advantageously, the method of the second aspect produces the polymerical opal of the first aspect.

The polymer and the additive may be as defined in relation to the first aspect.

It may be appreciated that the conditions which cause the solvent to evaporate at a rate whereby evaporation of the solvent dominates over diffusion and sedimentation of the polymer and the additive will vary depending upon the properties of the polymer, the additive and the solvent. However, the conditions may be calculated by the skilled person.

Preferably, evaporating the solvent at a rate whereby evaporation of the solvent dominates over diffusion and sedimentation of the polymer and the additive comprising controlling the conditions that the dispersion is exposed to such that the Peclet number (Pe) is at least 0.25, more preferably at least 0.5 or at least 0.75, and more preferably is at least 1, at least 2.5, at least 5 or at least 7.5 and most preferably is at least 10.

Preferably, evaporating the solvent at a rate whereby evaporation of the solvent dominates over diffusion and sedimentation of the polymer and the additive comprising controlling the conditions that the dispersion is exposed to such that the sedimentation number (Ns) is less than 10, more preferably less than 7.5, less than 5 or less than 2.5, and most preferably is less than 1.

In some embodiments, the dispersion may be maintained at a temperature between 1° C. and 80° C., between 5° C. and 60° C., between 10° C. and 40° C., between 15° C. and 30° C. or between 17.5° C. and 25° C. while the solvent is evaporated. In some embodiments, the solvent maintained at a humidity between 5% and 99%, between 10% and 95%, between 20% and 90%, between 30% and 85%, between 40% and 80%, between 50% and 75%, between 60% and 70% or between 62.5% and 67.5% while the solvent is evaporated.

The dispersion may comprise a surfactant. The surfactant may be as defined in the first aspect.

The solvent may comprise water.

Providing the dispersion comprising the polymer and the additive in the solvent may comprise:

- providing a first dispersion comprising the polymer in a first solvent;
- providing a second dispersion comprising the additive in a second solvent; and
- contacting the first and second dispersions to provide the dispersion comprising the polymer and the additive in the solvent.

Subsequent to contacting the first and second dispersions, the method may comprise sonicating the dispersion comprising the polymer and the additive in the solvent. The dispersion comprising the polymer and the additive may be sonicated for at least 1 minute, more preferably at least 2 minutes, at least 4 minutes or at least 6 minutes, and most preferably for at least 8 or 9 minutes.

The first dispersion may comprise the surfactant. Alternatively, or additionally, the second dispersion may comprise the surfactant. In a preferred embodiment, the second dispersion comprises the surfactant.

Preferably, the polymer comprises between 10 and 90 wt % of the first dispersion, more preferably between 20 and 80 wt % or between 30 and 75 wt % of the first dispersion, and most preferably between 40 and 70 wt %, between 45 and 65 wt % or between 50 and 60 wt % of the first dispersion.

Preferably, the second dispersion comprises between 0.001 and 50 $mgml^{-1}$ of the additive, more preferably the second dispersion comprises between 0.01 and 10 $mgml^{-1}$ or between 0.05 and 5 $mgml^{-1}$ of the additive and most preferably between 0.01 and 10 $mgml^{-1}$ or between 0.05 and 5 $mgml^{-1}$ of the surfactant, and most preferably between 0.1 and 1 $mgml^{-1}$, between 0.25 and 0.75 $mgml^{-1}$ or 0.4 and 0.6 $mgml^{-1}$ of the additive.

Providing the first dispersion may comprise:

- providing an emulsion comprising the first solvent and a plurality of monomers; and
- allowing the monomers to polymerise to provide the first dispersion comprising the polymer in the first solvent.

Preferably, the emulsion comprises a further surfactant. Suitable further surfactants and the concentrations thereof are well known in the art.

Preferably, the plurality of monomers are as defined in the first aspect.

The first solvent may comprise water.

Providing the second dispersion may comprise contacting the additive and the second solvent to provide the second dispersion.

Prior to contacting the additive and the second solvent, the method may comprise contacting the second solvent and a surfactant. The surfactant may comprise a non-ionic surfactant. The non-ionic surfactant may be as defined in relation to the first aspect. Accordingly, contacting the additive and the second solvent may comprise contacting the additive and a solution comprising the second solvent and the surfactant. Preferably, the amount of the second solvent and the surfactant which are contacted is sufficient to provide a solution comprising between 0.001 and 100 $mgml^{-1}$ of the surfactant, more preferably between 0.01 and 10 $mgml^{-1}$ or between 0.05 and 5 $mgml^{-1}$ of the surfactant, and most preferably between 0.1 and 1 $mgml^{-1}$, between 0.25 and 0.75 $mgml^{-1}$ or 0.4 and 0.6 $mgml^{-1}$ of the surfactant.

The additive and the second solvent may be contacted in an amount sufficient to provide a solution comprising between 0.1 and 1000 $mgml^{-1}$ of the additive, more preferably between 1 and 500 $mgml^{-1}$, between 2.5 and 250 $mgml^{-1}$ or between 5 and 100 $mgml^{-1}$ of the additive, and most preferably between 10 and 75 $mgml^{-1}$, between 15 and 50 $mgml^{-1}$ or between 20 and 30 $mgml^{-1}$ of the additive.

Preferably, subsequent to contacting the additive and the second solvent, the method comprises sonicating the solution comprising the additive and the second solvent. The method may comprise sonicating the solution for at least 15 minutes, at least 30 minutes, at least 45 minutes or at least 60 minutes, more preferably the method comprises sonicating the solution for at least 2 hours or at least 3 hours.

Preferably, subsequent to sonicating the solution, the method comprises leaving the solution to stand. Preferably, the method comprises leaving the solution to stand for between 30 minutes and 200 hours, between 1 hour and 100 hours, between 2 hours and 48 hours or between 4 hours and 36 hours, and more preferably between 6 hours and 24 hours, between 8 hours and 20 hours, between 10 hours and 18 hours or between 12 hours and 16 hours.

Preferably, subsequent to leaving the solution to stand, the method comprises obtaining a top fraction of the solution. The top fraction of the solution may comprise between 1 and 99% of the solution, more preferably between 10 and 90%, between 20 and 80% or between 30 and 70% of the solution, and most preferably between 40 and 60% or between 45 and 65% of the solution.

Preferably, the method comprises centrifuging the top fraction of the solution. The top fraction of the solution may be centrifuged for between 1 minutes and 100 hours, more preferably between 15 minutes and 10 hours, between 30 minutes and 5 hours or between 45 minutes and 4 hours, and most preferably between 60 minutes and 3 hours, between 70 minutes and 2 hours or between 80 minutes and 100 minutes. The top fraction of the solution may be centrifuged at a speed between 10 and 100,000 rpm, more preferably between 100 and 10,000 rpm, between 250 and 7,500 rpm or between 500 and 5,000 rpm, and most preferably between 750 and 4,000 rpm, between 1,000 and 3,000 rpm, between 1,200 and 2,000 rpm or between 1,400 and 1,750 rpm.

Preferably, subsequent to centrifuging the top fraction of the solution, the method comprises obtaining a top fraction thereof. The top fraction may comprise between 1 and 99% of the centrifuged solution, more preferably between 5 and 90%, between 10 and 70% or between 15 and 50% of the centrifuged solution, and most preferably between 20 and 40% or between 25 and 45% of the centrifuged solution. Preferably, the top fraction of the centrifuged solution is the second dispersion.

The polymeric opal may be used in a number of applications.

In accordance with a third aspect, there is provided a photonic paper comprising the polymeric opal of the first aspect.

As explained in the examples, the polymeric opal of the first aspect can change colour upon exposure to different solvents. Accordingly, the photonic paper may be used with a solvent in an anti-counterfeiting application. For example, a pen containing a solvent, such as 1,6-hexanediamine, can be used to write on a surface of the photonic paper, thereby causing the surface to change colour for a short period of time.

In accordance with a fourth aspect, there is provided an anti-counterfeiting kit comprising the photonic paper of the third aspect and a pen comprising a solvent.

The solvent may comprise a solvent with a higher refractive index than water. For instance, the solvent may comprise 1,6-hexanediamine Accordingly, in accordance with a fifth aspect, there is provided an item of jewellery or a time-temperature indicator comprising the polymeric opal of the first aspect.

The item of jewellery may comprise a polymer coating. The polymer coating may be configured to prevent evaporation of an interstitial liquid.

The time-temperature indicator may comprise a polymer coating. The polymer coating may be configured to control the rate of evaporation of an interstitial liquid.

Accordingly, in accordance with a sixth aspect, there is provided a mechano-chromic sensor comprising the polymeric opal of the first aspect.

A mechano-chromic sensor may be viewed as a sensor configured to exhibit a colour change in response to a mechanical input. The mechanical input may comprise a stress or strain.

The mechano-chromic sensor may comprise a fingerprint scanner. The fingerprint scanner may further comprise a spectrometer configured to record a colour change in the polymeric opal. The spectrometer may be disposed on a first side of the polymeric opal, wherein the polymeric opal is configured to receive a user's fingerprint on a second side thereof, and the first side of the polymeric opal is opposed to the second side thereof.

The mechano-chromic sensor may comprise a strain sensor.

The mechano-chromic sensor may comprise a stretchable electronic circuit.

Alternatively, the mechano-chromic sensor may comprise an item of clothing, a patch configured to be applied to an item of clothing or a piece of exercise equipment.

The item of clothing may comprise a band. The band may be configured to fit around the arm or leg of the user, such that movement of the user's arm or leg causes the band to be stretched. Advantageously, a colour change in the band may enable the user to see determine they are exercising correctly.

Alternatively, the item of clothing may comprise an insole. Advantageously, a colour change on the insole caused by a user walking or running thereon will allow the user's gait to be analysed.

The piece of exercise equipment may comprise an elongate member or band configured to be stretched by a user. Advantageously, a colour change in the elongate member or band will allow the user to determine how hard they have stretched the elongate member, and thereby determine how effective their work-out is.

In accordance with a seventh aspect, there is provided a waveguide comprising the polymeric opal of the first aspect.

The waveguide may be a three dimensional (3D) waveguide.

The polymeric opal may define a channel therein. Preferably, the polymeric opal exhibits a stopband at a given wavelength. Preferably, the channel is configured to allow light with the given wavelength to pass therethrough. Advantageously, light which may not pass through the polymeric opal may pass through the channel. The polymeric opal may have a stop band as defined in relation to the first aspect.

In accordance with an eighth aspect, there is provided a scaffold for tissue engineering comprising the polymeric opal of the first aspect.

The scaffold may be for cardiac tissue engineering and/or for cartilage tissue engineering. The scaffold may be for growing cardiomyocytes (CMs) or chondrocytes.

In accordance with a ninth aspect, there is provided a sensor configured to sense a target analyte comprising the polymeric opal of the first aspect.

The sensor may be a gas sensor. Accordingly, the sensor may be configured to sense the analyte in a gas. Alternatively or additionally, the sensor may be configured to sense the analyte in a solution. The sensor may be configured to sense one or more of mustard gas, a decomposition product of a nerve agent, sarin, acetone, nitrogen dioxide ($NO_2$), ammonia ($NH_3$), hydrogen sulphide ($H_2S$), tetrahydrofuran (THF), nitrotoulene, 1,5-dichloropentane (DCP), 1,4-dichlorobenzene (DCB), carbon monoxide (CO), hydrogen ($H_2$), ethanol, chloroform, toluene, acetonitrile, methanol, xylene, sulphur dioxide ($SO_2$), methane or carbon dioxide ($CO_2$).

In accordance with a tenth aspect, there is provided use of the polymeric opal of the first aspect as a photonic paper, in an item of jewellery, as a time-temperature indicator, in a mechano-chromic sensor, in a waveguide, as a scaffold for tissue engineering or as a sensor configured to sense a target analyte.

All features described herein (including any accompanying claims, abstract and drawings), and/or all of the steps of any method or process so disclosed, may be combined with any of the above aspects in any combination, except combinations where at least some of such features and/or steps are mutually exclusive.

For a better understanding of the invention, and to show how embodiments of the same may be carried into effect, reference will now be made, by way of example, to the accompanying drawings, in which:—

Figure 5:
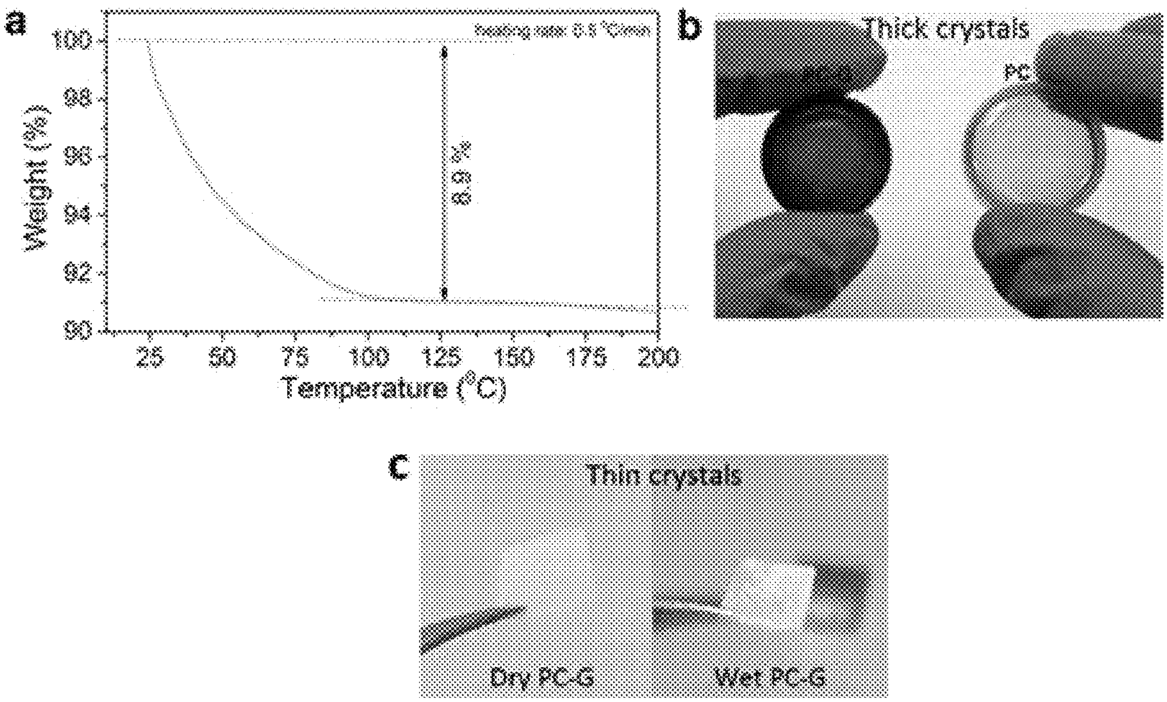
Figure 6:
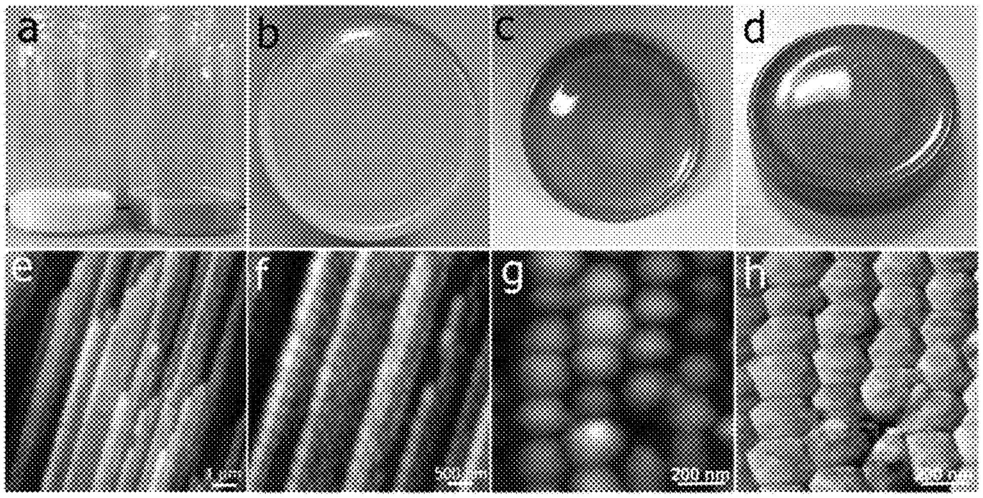
Figure 7:
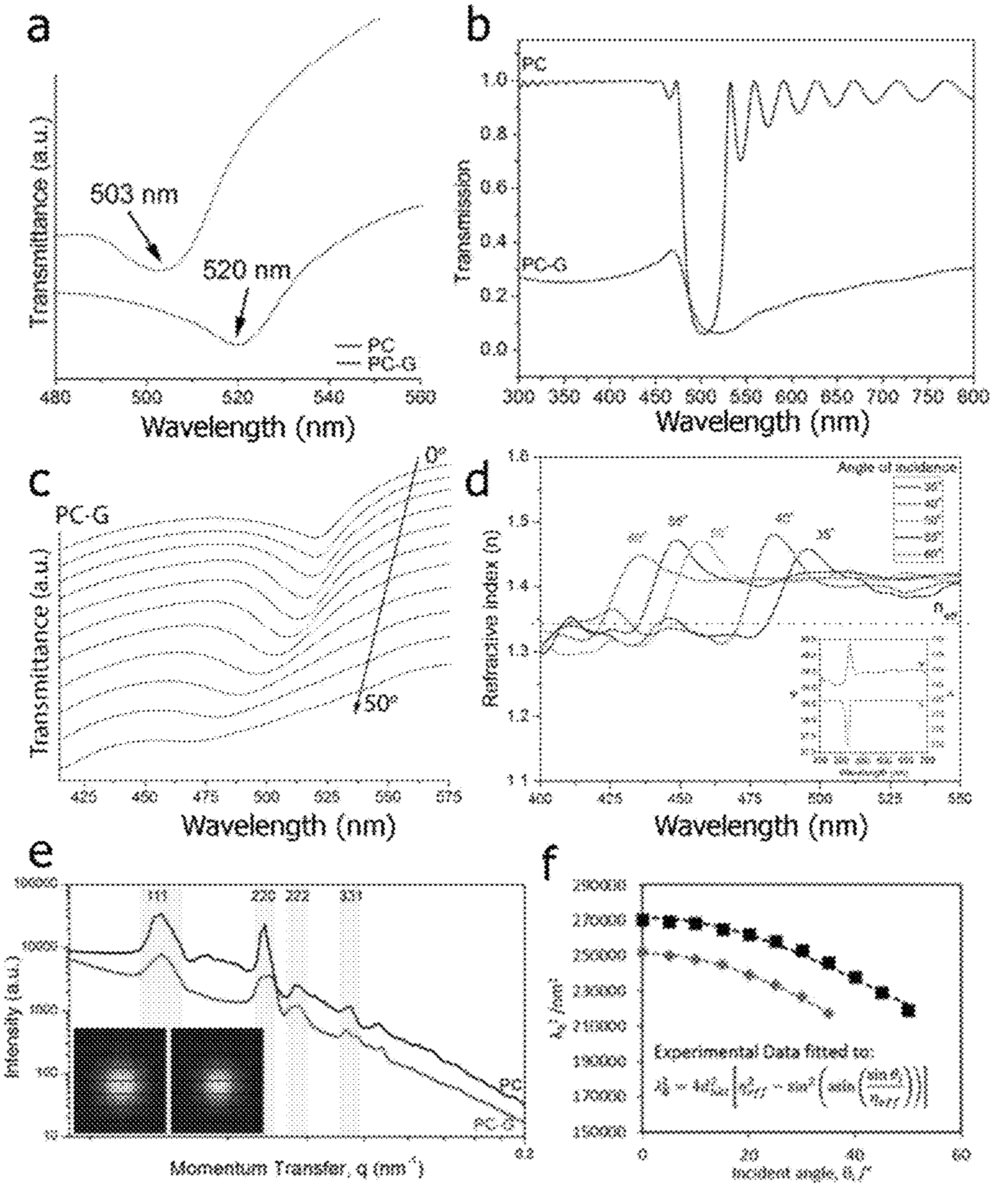
Figure 8:
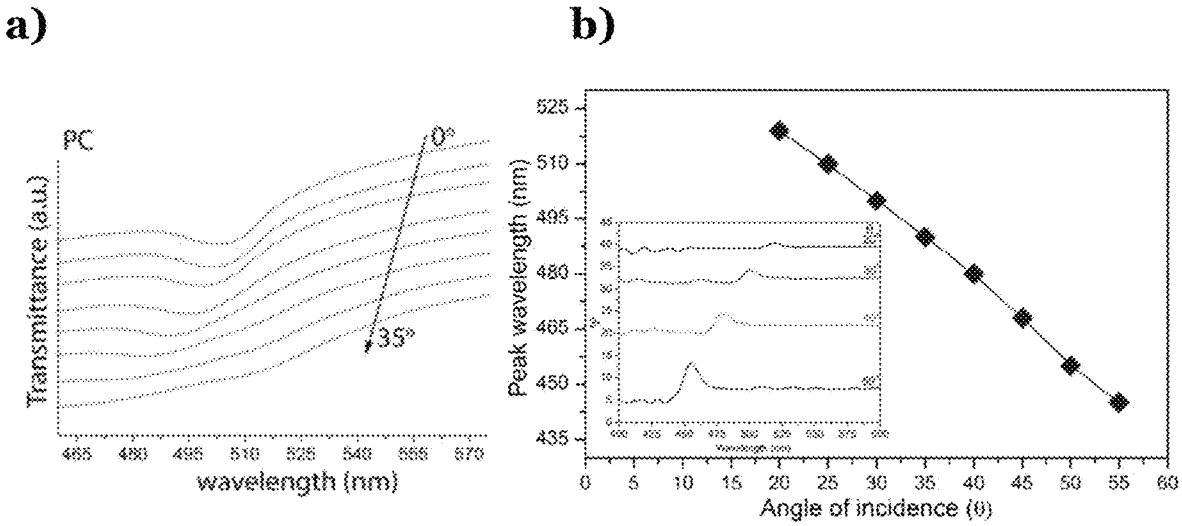
Figure 10:
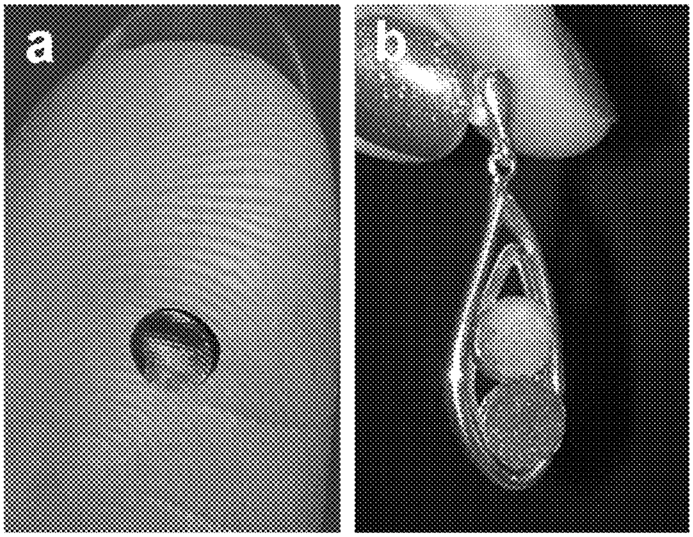
Figure 11:
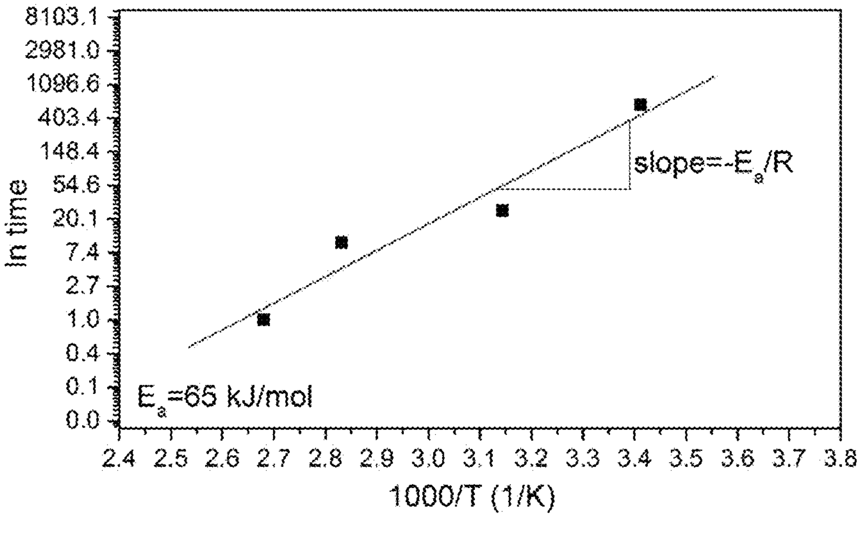
Figure 12:
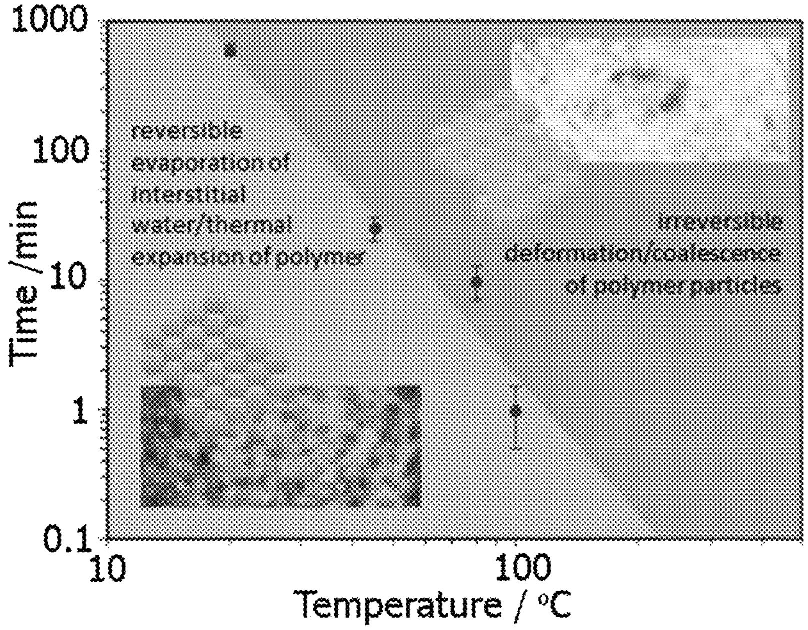
Figure 13:
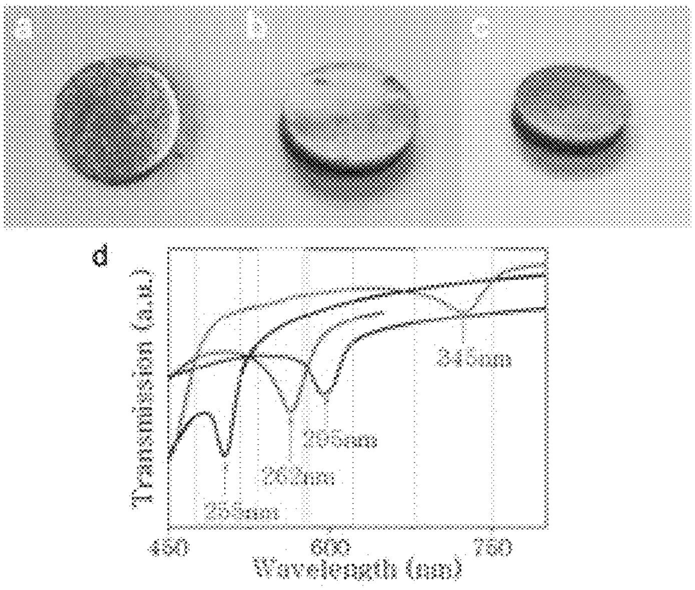
Figure 14:
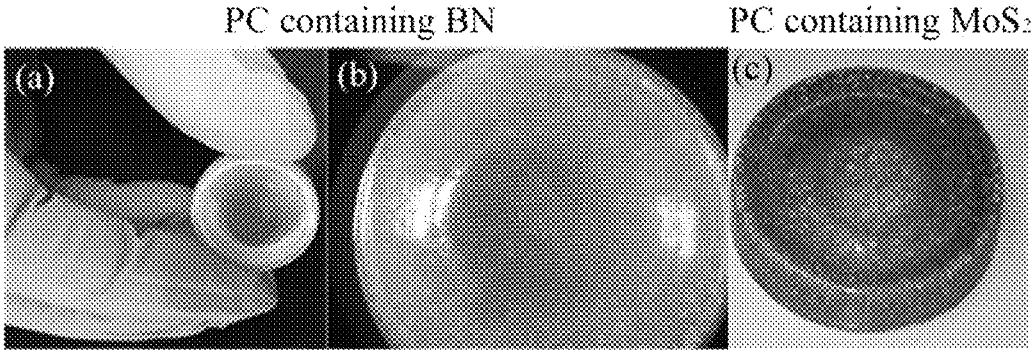
Figure 15:
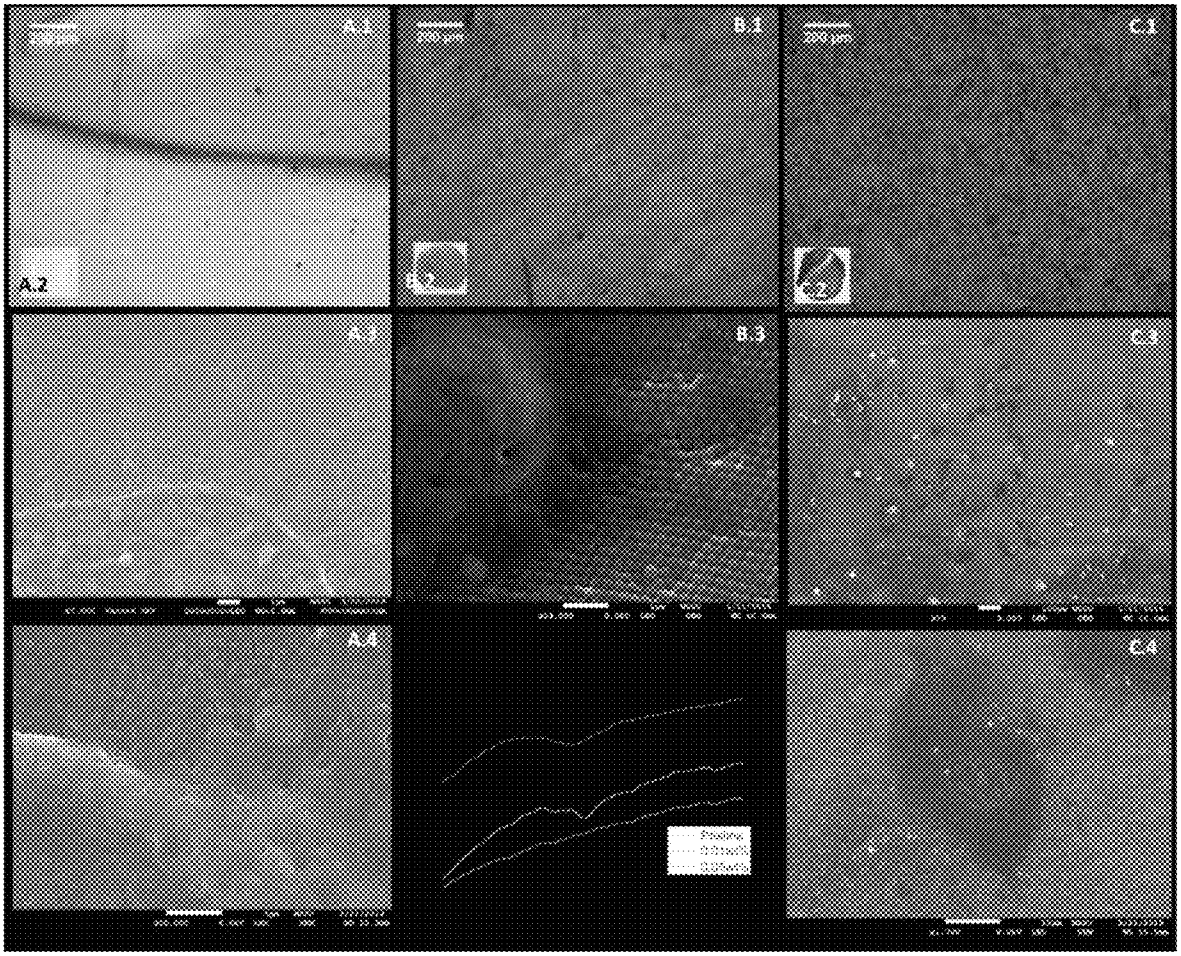
Figure 16:
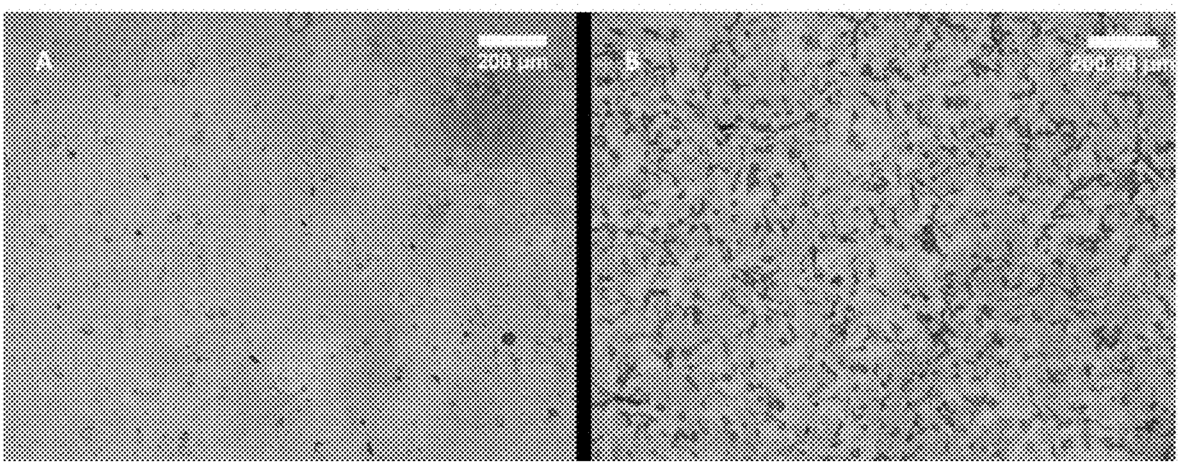
Figure 17:
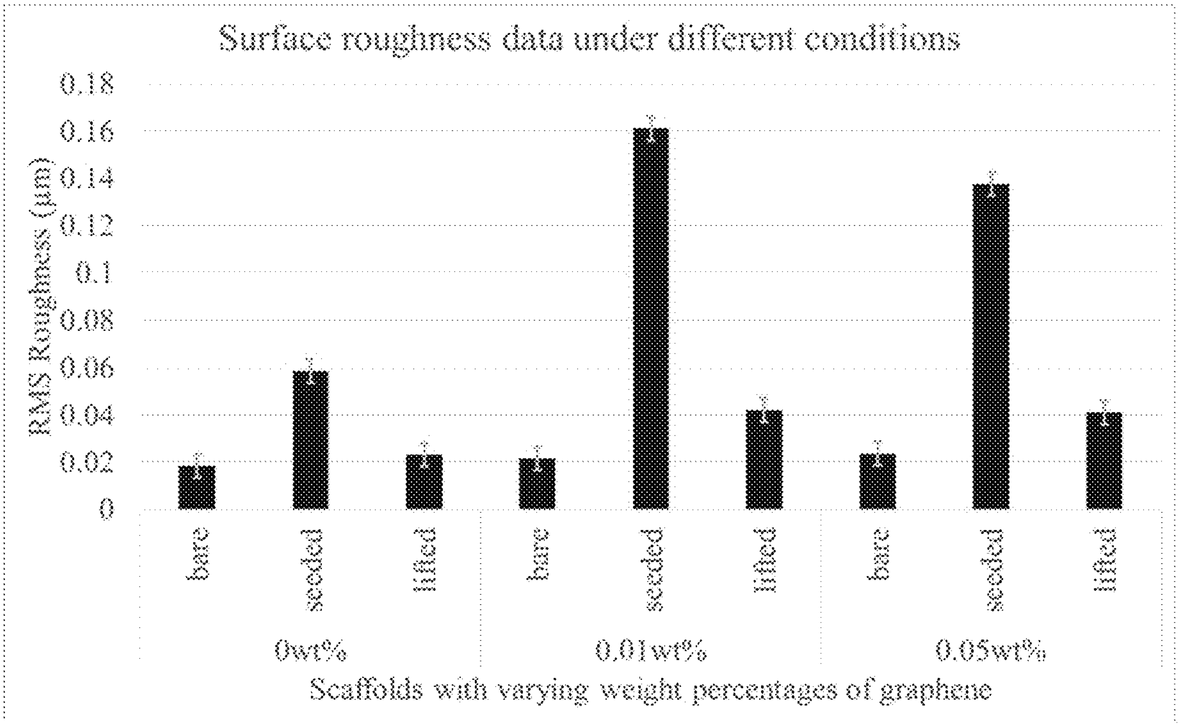
Figure 18:
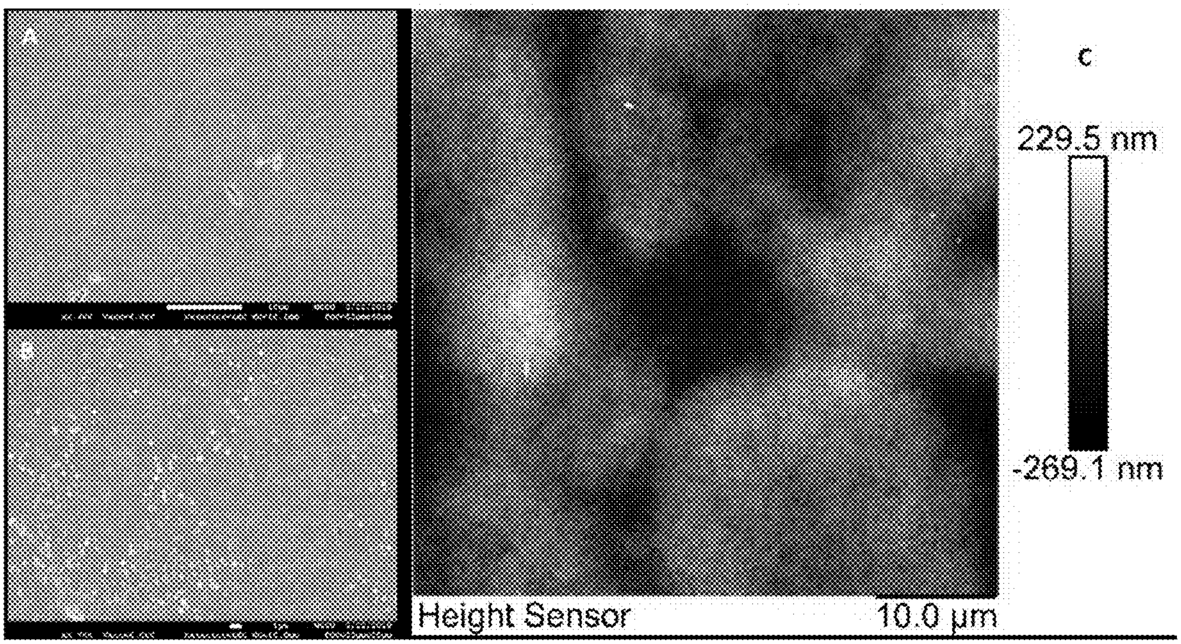
Figure 19:
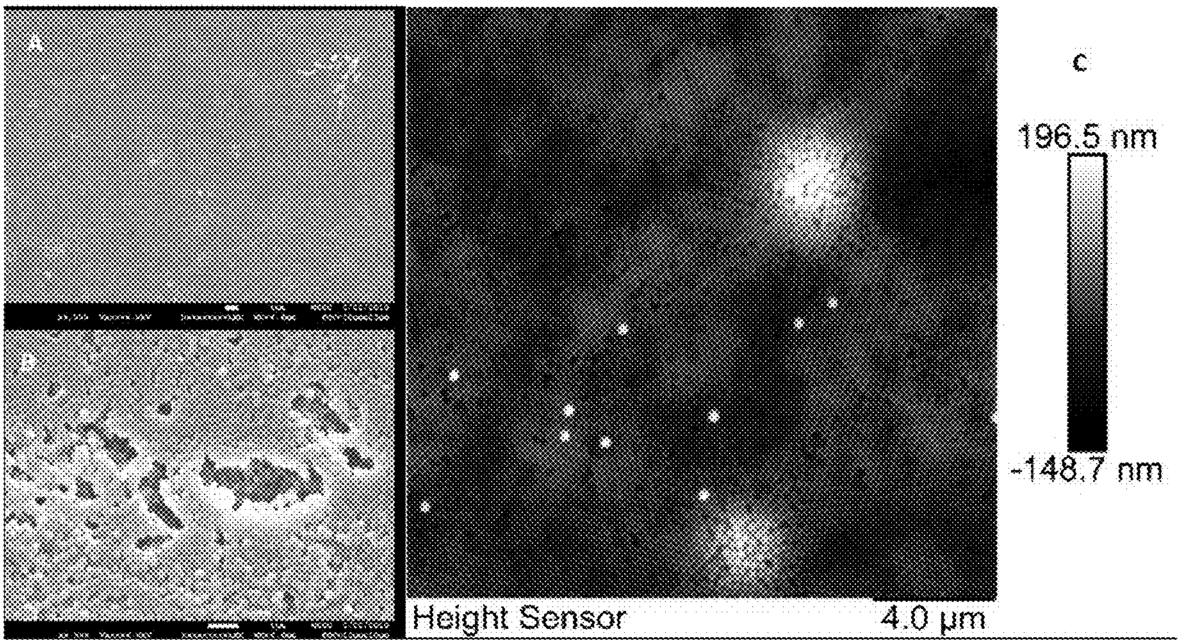
Figure 20:
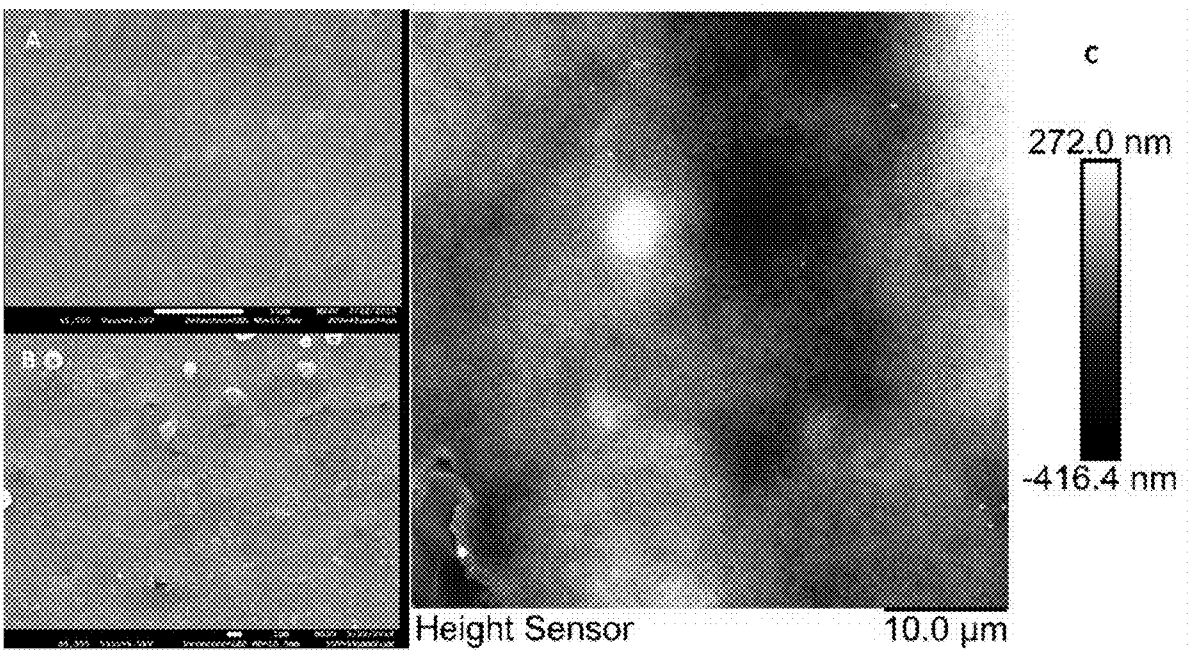
Figure 21:
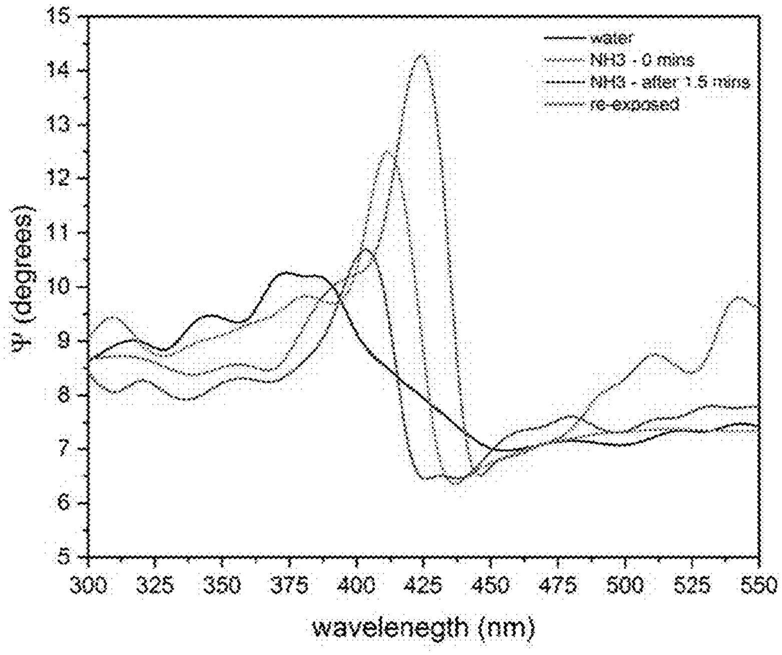

FIG. 3*a* is a graph showing the calculated Stokes' settling velocity of graphene flakes as a function of their size compared to the Stokes settling velocity of polymer particles with 255 nm diameter; FIG. 3*b* is a histogram of the size distribution of graphene flakes obtained by TEM. The inset is a representative TEM image of a graphene flake; and FIG. 3*c* is a histogram showing graphene flake thickness obtained by AFM. The inset is a representative zoomed image of graphene flakes and corresponding line scan taken horizontally through the image as marked with a white line. From this analysis, the topographic height of the graphene flake is measured to be about 2.45 nm. Considering that the apparent AFM thickness of a single layer of liquid exfoliated graphene is typically ~0.9 nm6, the AFM histogram suggests the graphene sheets to be composed of only a few-layers;

FIG. 4*a* is a drying regime map based on dimensionless coordinates Peclet number (Pe) and sedimentation number (Ns); and FIGS. 2*b* and 2*c* are photographs of the crystals forming during evaporation-driven self-stratification showing a top view and a side view, respectively;

FIG. 5*a* shows thermogravimetric analysis (TGA) data showing the amount of water present within the graphene doped photonic crystal (PC-G); FIG. 5*b* is a photograph showing the loss of colour in the PC-G (left) and pristine photonic crystal (PC) (right) crystals after a complete loss of water after 72 hours of drying under ambient conditions; and FIG. 5*c* is a photograph showing the difference in colour for thin crystals of PC-G when wet or dry;

FIG. 6 shows photos and microstructure of photonic crystals. In particular, FIG. 6*a* is a photo of PC (left) and PC-G (right) latex dispersions; FIG. 6*b* is a photo of a top-view of a PC; FIG. 6*c* is a top-view of a PC-G; FIG. 6*d* is a photo of the same PC-G of FIG. 6*c* when observed from a different viewing angle; FIGS. 6*e* and 6*f* are AFM topographic images of PC-G cross-section showing the layered structure;

FIG. 6*g* is an AFM topographic image of PC-G cross-section showing height; and FIG. 6*h* is a phase images of the top surface of PC-G showing graphene flakes (in false colour) present in the interstitial sites;

FIG. 7*a* is a graph showing the transmittance as a function of wavelength obtained at $\theta=0°$ for a PC and PC-G, showing significant red-shifting of the stopband due to the inclusion of graphene; FIG. 7*b* is a simulated transmission from a PC sample and a PC-G sample. The thickness of the samples was 4000 nm; FIG. 7*c* shows the variation in the transmission spectra with the angle of light incidence for the PC-G;

FIG. 7*d* shows the refractive index $n(\lambda)$ of PC-G calculated from ellipsometric data at different angles of light incidence. For comparison, dotted line shows the $n_{eff}$ obtained as shown in FIG. 7*f*. The inset shows the ellipsometric parameters $\Psi(\lambda)$ and $\Delta(\lambda)$ measured at an angle of incidence of 20°; FIG. 7*e* shows the cSAXS data for the PC and PC-G with insets showing the diffraction rings; and FIG. 7*f* shows experimental (squares and diamonds) and simulated (dashed black and blue lines) Bragg wavelengths, $\lambda_B$ for the PC (diamonds) and PC-G (squares). The data are fitted using a linear least squares regression to the equation shown in the inset (where $d_{hkl}$ is the interplanar spacing, $n_{eff}$ is the effective refractive index and $\theta$ is the angle of incidence);

FIG. 8*a* shows the variation in the transmission spectra with the angle of light incidence for PC; and FIG. 8*b* shows the position of the peak in the $\Psi$ spectra as a function of the angle of incidence (measured with respect to the normal at the sample surface). The inset shows the spectra for four different angles;

FIG. 9*a* shows the deformation of stretchable PC-G before (green) and during (blue) 150% elongation. The insets show schematic representations of the variation in crystal morphology and the associated simulated change in the stopband position as a function of strain ($\delta$); FIG. 9*b* shows the blue-shifting of the stopband as a function of applied load, where A corresponds to the PC-G crystal before and B after the load was applied;

FIG. 9*c* shows the transmittance spectra for the PC-G showing the red-shift of the stopband when the crystal is subjected to an in-plane compression. Optical photos showing the PC-G before and during macroscopic compression with corresponding AFM topographic images of microscopic particle deformation are also provided; and FIG. 9*d* is an optical photo of a PC-G subjected to bending;

FIG. 10*a* is a photograph of a fingerprint imprinted into a PC-G, ridges can be seen in the PC-G which rests on a finger; FIG. 10*b* is a photograph of a PC-G embedded in an earring;

FIG. 11 is a graph allowing the determination of activation energy for diffusion for the PC-G crystals;

FIG. 12 is a time versus temperature plot showing regimes at which the interfacial structural transitions occur, resulting in an associated colour change. The inset images are optical photographs of the PC-G crystal and schematic representation of particle boundaries showing the transition of colour from green to transparent;

FIG. 13*a-c* shows photos of photonic crystals made of 295 nm polymer particles containing 0.005 vol. % graphene when observed from different viewing angles; and FIG. 13*d* is the transmission spectra of the PC-G showing the change in the stopband position as a function of the particle size of the polymer (as indicated);

FIG. 14 shows photos of fabricated photonic crystals containing (a,b) boron nitride (BN) and (c) molybdenum disulfide ($MoS_2$);

FIG. 15 shows a collection of microscopy images to show the initial cytotoxicity test of the thin film photonic crystal with varying weight percentages of graphene. Pictures labelled with the prefix; (A) are pristine films (0 wt % graphene), with (B) being 0.01 wt % of graphene and (C) being 0.05 wt %. All films were treated the same, they were soaked for about 4 hrs in cell media called Dulbecco's Modified Eagle Medium (DMEM) under UV light before being seeded with about 10000 chondrocytes per sample and 1 ml of supplemented DMEM, they were kept in an incubator at 37° C. & 5% $CO_2$ for 5 days. The cells were fixed with an ethonal based fixative. Images labelled with the suffix 1 show optical microscope images in reflectance mode of the PCs rehydrated by deionised water. Images labelled with the suffix 2 shows a digital photo of the fix cells on the dehydrated films. Images labelled with the suffix 3 or 4 are SEM images of the films. D: Is the UV-Vis spectrograph of the films with fixed cells on them and rehydrated in deionised water;

FIG. 16A shows the dehydrated 0.01 wt % graphene scaffold after 5 days of growth in reflectance mode of the optical microscope; and FIG. 16B shows the 0.05 wt % graphene scaffold after 5 days of growth in reflectance mode;

FIG. 17 shows the root mean squared (RMS) roughness of 50×50 $\mu m^2$ area of each film condition;

FIG. 18 is a collection of SEM & AFM images of thin films with 0 wt % of graphene after being seeded with chondrocytes for 5 days, and cells removed enzymatically;

FIG. 19 is a collection of SEM & AFM images of thin films with 0.01 wt % of graphene after being seeded with chondrocytes for 5 days, and cells removed enzymatically;

FIG. 20 is a collection of SEM & AFM images of thin films with 0.05 wt % of graphene after being seeded with chondrocytes for 5 days, and cells removed enzymatically; and FIG. 21 shows spectroscopic ellipsometry reflectance data of PC enhanced with $MoS_2$ nanosheets showing a change in intensity of the reflectance peak upon exposure to ammonia and corresponding colour change of the crystal from dark green to vivid green.

The inventors investigated two types of sedimentation methods to fabricate novel colloidal crystals containing graphene: a) sedimentation under gravity in a closed system, as described in example 1, and b) evaporation-driven self-stratification, as described in example 2.

Example 1—Forming Colloidal Crystals Using Sedimentation Under Gravity in a Closed System

Materials and Methods

Colloidal Dispersion

The latex polymer used was provided by DSM Coating Resins (Waalwijk, The Netherlands), and is based on a random copolymer of butyl acrylate (BA), methyl methacrylate (MMA) and methacrylic acid (MAA) in a molar ratio of BA:MMA:MAA of 41:56:3. The polymer particle size was 255 nm, its dry glass transition temperature ($T_g$) was 28° C., the initial solids content was 55 wt. % and the viscosity was 42 mPa·s. The latex dispersion was prepared by semi-batch emulsion polymerization.

Graphene Dispersion 2.5 g of graphite powder purchased from Sigma Aldrich (product number 332461) was added to 100 ml of aqueous surfactant solution (0.5 $mgml^1$ Triton X-100) to give an initial graphitic concentration of 25 $mgml^{-1}$. This mixture was sonicated using a sonic tip (Sonics VX-750 ultrasonic processor with flat head tip) for 4 hours. The dispersion was left to stand overnight. The top 50 ml of the suspension was decanted into two 28.5 ml vials and centrifuged (Hettich Mikro 22R) for 90 minutes at 1500 rpm. The top 14 ml of each centrifuged vial was then decanted into a 14 ml vial. The final concentration of graphene in water was 0.57 $mgml^{-1}$.

Colloidal and Graphene Dispersion

Graphene-surfactant dispersions prepared as described above were blended with latex by hand stirring and then homogenized by tip-sonication in an ice-cold water bath for 10 minutes. The volumetric ratio of the latex to the graphene surfactant dispersion was 100:0.012. The final volume fraction of graphene in the composite dispersion relative to the polymer was 0.005 vol. %.

Results and Discussion

Figure 1:
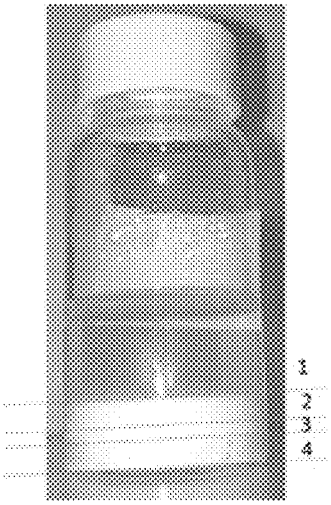
FIG. 1 is a photo showing the sedimentation of polymer latex particles as a result of a standard gravitational sedimentation that has taken 6 month to occur.

A pristine colloidal dispersion was placed in a sealed vial and left on an open bench at room temperature for 6 months. As a result of sedimentation, four distinct regions were formed as shown in FIG. 1. The layers were (1) clear liquid, (2) a constant zone, which comprised a uniform suspension of particles, (3) a variable zone, which consisted of a layer of decreasing particle volume fraction with depth, and (4) sediment.

After the polymer particles sedimented out, the water from above was removed and then the crystal was left to dry with an open lid to evaporate the remaining water. The drying of the colloidal crystals was accompanied by a shrinkage process (visually observed volume change upon drying) which is typically accompanied by the deformation of particles into rhombic dodecahedra structures.

For particles with a diameter less than 500 nm, gravitational sedimentation is a very slow process due to the Brownian motion counteracting the sedimentation. The sedimentation rate is dependent on the density difference between a polymer and a dispersing medium. The settling velocity of polymer latex spheres under gravitational settling at room temperature can be calculated using Stokes' Law:

$$U_0 = \frac{2}{9}\frac{(\rho_P - \rho_L)}{\eta} g r^2 \quad \text{(eq. 1)}$$

where $U_0$ is the sedimentation velocity, $\rho_p$ is the particle density, $\rho_L$ is the liquid (water) density, $\eta$ is the viscosity of the liquid (water), g is the gravitational acceleration, r is the particle radius.

With g as 9.8 $m/s^2$, $\rho_p$ as 1.1 $g/cm^3$, $\rho_L$ as 1 $g/cm^3$, and $\eta$ as 1.002 mPa s, eq. 1 gave a settling velocity of $3.54\times10^{-9}$ m/s for polymer latex particles with a diameter of 255 nm.

Polymer particles are stabilised with charged surfactant molecules, significantly enhancing their colloidal stability. Therefore the actual sedimentation rate of polymer particles will be much lower in the presence of a surfactant, with polymer particles highly stable over a period of years.

Figure 2:
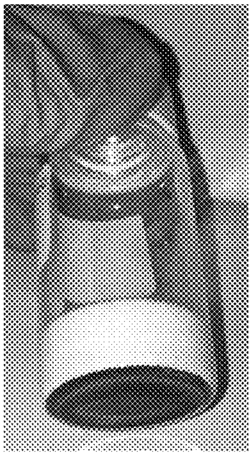
FIG. 2 is a photo showing the sedimentation of polymer latex particles and graphene as a result of gravitational sedimentation that has taken 6 month to occur.

When the same gravitational sedimentation method was implemented for the colloidal and graphene dispersion, graphene sedimented out significantly faster than the polymer particles, see FIG. 2, because of their larger effective size, resulting in phase separation and the formation of black sediment at the bottom of the vial.

Figure 3:
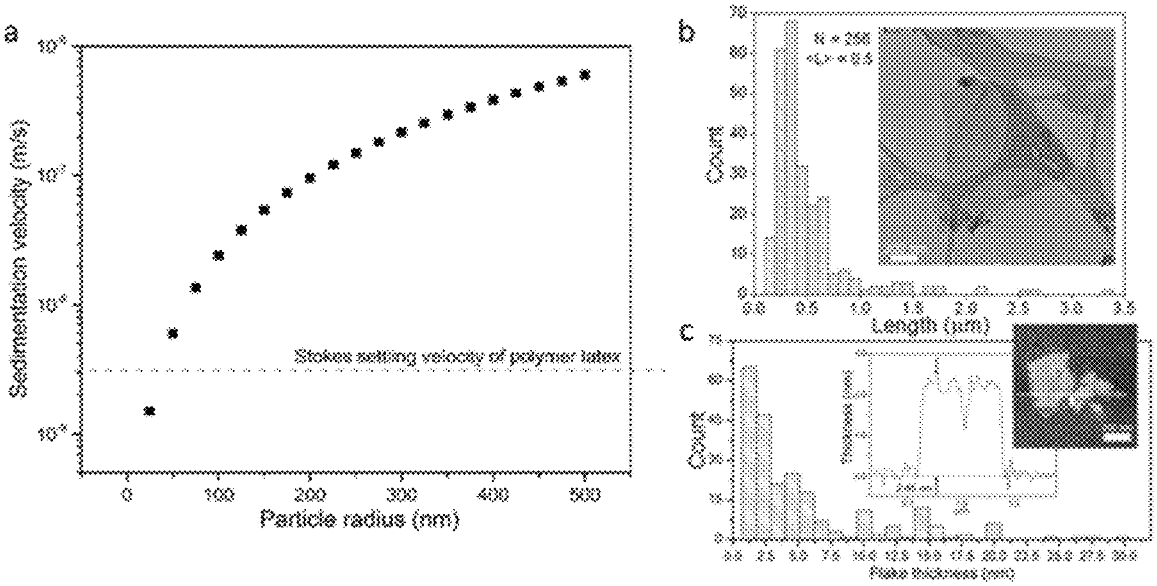

To explain this, the inventors used the above equation to calculate the sedimentation rate of graphene from an aqueous suspension. As shown in FIG. 3, in the graphene suspension used the majority of flakes were found to have thicknesses between 1 and 5 layers with lateral sizes ranging from ~100 nm to ~3.5 μm. As can be seen in FIG. 3*a*, the settling velocity of graphene is significantly higher than the settling velocity of latex particles, making the gravitational sedimentation an unfeasible process for the fabrication of graphene doped photonic crystals (PC-G).

Example 2—Forming Colloidal Crystals Using Evaporation-Driven Self-Stratification

Materials and Methods

Formation of Graphene Doped Photonic Crystals (PC-Gs)

A colloidal and graphene dispersion was prepared as described in example 1. 2.5 mL of the dispersion was left in an open glass beaker at room temperature for 4-6 days. The crystals were formed under a relative humidity of ~65%.

Formation of Pristine Photonic Crystals (PCs)

A colloidal dispersion was also prepared as described in example 1. After preparation the same amount of surfactant was added to the colloidal dispersion as was present in the colloidal and graphene dispersion. 2.5 mL of the dispersion was left in an open glass beaker and allowed to evaporate as described above.

Results and Discussion

During evaporation-driven self-stratification, there is a competition between evaporation of the water phase, sedimentation of the solid phase, and diffusion of the particles. The dimensionless Peclet number (Pe) that describes evaporation and diffusion processes taking place at an initial thickness $H_0$ can be written as:

$$Pe = \frac{EH_0}{D_0} \quad \text{(eq. 2)}$$

where E is the experimentally obtained water evaporation rate ($E=1.1\times10^{-7}$ m $s^{-1}$), $H_0$ is the initial thickness of the drying crystal, and $D_0$ is the Stokes-Einstein diffusion coefficient ($D_0=kT/6\pi\eta r$, where k is the Boltzmann's constant, and T is the temperature). From this equation, it can be seen that for a large Peclet number (Pe>>1) evaporation is dominates, but for Pe<<1 diffusion dominates. Cardinal et al. (Cardinal, C. M., Jung, Y. D., Ahn, K. H. & Francis, L. F. Drying regime maps for particulate coatings. AIChE Journal 56, 2769-2780, doi:10.1002/aic.12190 (2010)) created drying maps that were used to predict which drying regime dominates the formation of the PC-Gs, see FIG. 4*a*. In FIG. 4*a*, log Pe is plotted versus the sedimentation number, Ns, that describes the strength of sedimentation to evaporation given by:

$$N_S = \frac{U_0}{E} = \frac{Pe_{sed}}{Pe} \quad \text{(eq. 3)}$$

Where $$Pe_{sed} \frac{U_0 H_0}{D_0} \quad \text{(eq. 4)}$$

According to the inventors' calculations, the rate of these three processes clearly show that evaporation dominates over diffusion and sedimentation. Accordingly, as the air/water interface at the top of the film falls downward during evaporation its sweeps up the polymer particles and graphene, accumulating them at the top. Thus, in this mechanism, the colloidal crystal grows from the top downward in a self-stratifying layer, see FIGS. 4*b* and 4*c*.

The inventors note that the presence of charged carboxylic acid groups within the MAA of the copolymer leads to improved polymer particle ordering during the evaporation step, and also creates membranes that inhibit interparticle chain diffusion. Enhanced robustness of the crystals is also affected by the partial break-up of the membranes and subsequent chain interdiffusion.

Example 3—Analysis of the Structure and Optical Properties of PC-G

Materials and Methods

The PC-Gs and PCs produced in example 2 were analysed as described below.

Topographic Studies

An atomic force microscope (AFM) (NT-MDT, Moscow, Russia), using semi-contact mode, was employed. In order to study the cross-section, the PCs were fractured in liquid nitrogen. In order to obtain AFM images of the crystals under deformation, the crystals were first immersed in hot water (80° C.) for 3 seconds, deformed and then quickly immersed in an ice cold water bath in order to 'freeze' the structure for imaging.

Optical Transmission Measurements

The optical transmission measurements were carried out using a computer controlled double beam UV-Vis spectrophotometer (Shimadzu UV2501PC dual-beam spectrophotometer). The angle of incidence in the transmission measurement was changed from 0° to 550 by rotating the sample by means of a made-in-house sample holder. The absorption spectra were recorded from 200 to 900 nm.

Measurement of Standard Ellipsometric Quantities

The standard ellipsometric quantities, Ψ and Δ, which describe the changes in the amplitude and relative phase of the polarized light, respectively, were measured as a function of angle of incidence ranging from 20° to 55° at wavelengths ranging from 385 nm to 700 nm using a variable-angle spectroscopic ellipsometer (J. A. Woollam Co., USA).

Coherent Small Angle X-Ray Scattering Data cSAXS experiments were performed at the Paul Scherrer Institute, Switzerland. A sample-detector distance of 7160 mm (using a 7 m evacuated flight tube) and X-ray energy of 8.9812 keV was used for measurements; the spot size was approximately 0.7×0.7 mm. The PILATUS 2M detector was used to capture scattering patterns from the mounted samples; this detector has 1475×1679 pixels which are 172×172 μm (an active area of 253.7×288.8 mm). Captured scattering patterns were integrated through the azimuthal angle to obtain radial scattering profiles.

Results and Discussion

Similarly to natural opal gem stones, the colloidal crystals are filled with interstitial water (~9% by weight), see FIG. 5*a*, trapped during the crystal formation process. However, it is the inclusion of graphene that has a marked effect on the colour of the crystals. The pristine photonic crystal (PC) appears milky white likely due to the undesired scattering of light (FIG. 6*a*) with a faint tint of green as a result of a partial stopband at 503 nm (FIG. 7*a*). The incorporation of the graphene platelets, produces an intense green colour that gradually changes to a dark blue as the viewing angle is altered under natural lighting conditions (FIG. 6 *c* and *d*).

The inventors used Atomic Force Microscopy (AFM) of the crystal cross sections to understand the relationship between the perceived colour and the underlying morphology. As can be seen in FIG. 6*e-f*, on the micrometer scale, the polymer particles assemble into hexagonal close-packed (HCP) structures in well-defined planes with graphene present at interstitial sites (FIGS. 1 *g-h*). The layer number and length analysis of graphene by AFM and Transmission Electron Microscope (TEM) (FIGS. 2*b* and *c*) indicates that the active filler is predominantly few-layer graphene. The high aspect ratio and low flexural modulus of the graphene allows it to wet onto the polymer particles and as a result assemble at the interstitial sites within the crystal. Because the loading levels are extremely low, the presence of the graphene platelets has minimal effect on the polymer particle ordering and as a result the periodicity of the crystal.

The graphene-containing crystals also possess the necessary ordering to satisfy the Bragg condition, and a stopband positioned at approximately twice the particle diameter (~520 nm) is created (FIG. 7*a*), which is shifted up by 17 nm with respect to the pristine crystal. The fitting of the Bragg equation to the data in FIG. 7*f* allows for the calculation of the effective refractive index, $n_{eff}$. From the resulting analysis, the $n_{eff}$ of PC and PC-G crystals are 1.26±0.01 and 1.34±0.01, respectively, which are in reasonable agreement with the $n_{eff}$ values obtained using other methods. Simulations calculating the stopband positions of both the PC and the PC-G (FIG. 7*b*) are in good agreement with the experimental spectra (FIG. 7*a*), even though the simulations consider a 4 μm thick sample, while the fabricated crystals are as thick as 5 mm. Data obtained from coherent small angle x-ray scattering (cSAXS) (Figure fe) indicates that the lattice constant, relating to the inter-particle spacing, is 239±2 nm for the PC and 240±4 nm for the PC-G. As the interparticle distance is similar for both types of crystals, it is likely that the inclusion of graphene is responsible for the redshift of the stopband resulting from an increase in refractive index contrast.

In order to characterize the optical reflectivity and confirm the modifications to the refractive index in the presence of graphene, ellipsometry was performed at angles-of-incidence, θ, ranging from 20° to 60°. As the pristine PC has very weak reflectivity it was not possible to obtain a spectrum. For the PC-G, representative ellipsometric spectra, showing Ψ (the ratio of the amplitude change of the p- over the s-polarization) and Δ (corresponding difference in phase changes) as a function of wavelength at θ=20°, are presented in the inset of FIG. 7*d*. A strong peak in both ellipsometric angles is observed in the wavelength range from 500 to 530 nm explained by the reflections taking place at periodic interfaces of polymer particles in the colloidal crystal. In the remaining part of the spectral range, where the Bragg condition is not fulfilled, Ψ and Δ remain nearly constant. As expected, when increasing the angle-of-incidence (measured with respect to the normal of the sample surface), the resonance peak is shifted towards shorter wavelengths (FIG. 8*b*).

Remarkably, the effect of graphene inclusion on the optical properties of the PC-Gs occurs in the presence of only 0.005 vol. %. The strong enhancement of the structural colour of PC-G at such low volume fraction of graphene arises from the unique combination of graphene's high refractive index and its wide spectral absorbance in the visible range relative to the PC. In natural opals, various internal imperfections give rise to incoherent scattering events and part of the transmitted spectrum is diffusely reflected. This, in turn, increases the background reflectance across the visible spectrum and gives the samples a milky-white appearance. In the presence of graphene, the likelihood of absorption of the transmitted light is strongly enhanced as the incoherent scattering increases its effective optical path inside the opal. Hence, the parasitic reflections are reduced and the light Bragg-scattered by the stopband dominates the reflection spectrum. Favourably, graphene at such low volume content does not disrupt packing of polymer particles into ordered HCP structures allowing for specific tunability of the optical properties.

Example 4—Analysis of How Stress and Strain Affect the Optical Properties of the PC-Gs

Materials and Methods

Forces were applied to the PC-Gs and PCs produced in example 2 as described below.

Results and Discussion

Figure 9:
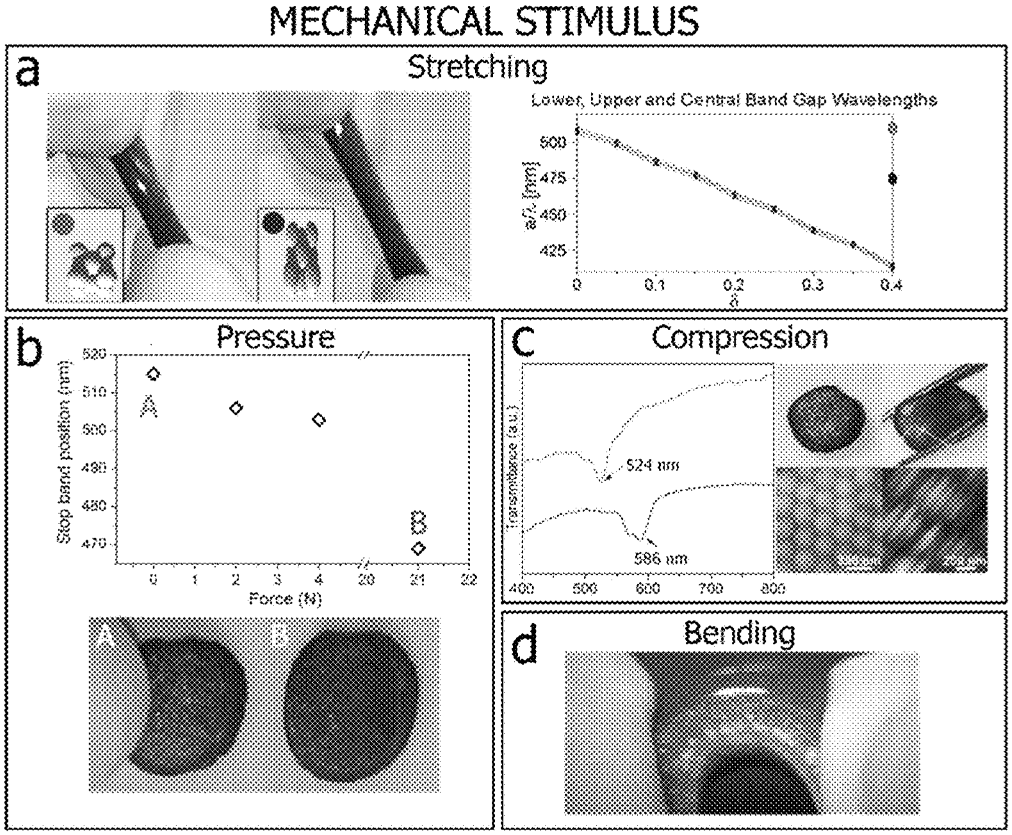

Due to the polymeric nature of the crystals, notable changes in the position of the stopband can be achieved by mechanical modulation using lateral compression, stretching, in-plane pressure or bending, see FIG. 9. The crystals are mechanically robust, possess elasticity, and can be deformed cyclically with no hysteresis in their performance.

The stopband of the deformed PC-G can be controlled mechanically, and a significant blueshift or redshift is observed, depending on the direction of the applied stress. For example, the stopband of a stretched sample shifts to shorter wavelengths as a result of a decrease in the spacing parallel to the crystal surface with increasing extension ratio. Consequently there is a visible change in the sample colour from green to blue. When the stress is released the sample returns to its original shape. A schematic representation of the deformation of a crystal lattice is shown in the inset in FIG. 9*a* together with an associated simulated change in the stopband as a function of strain (δ).

By applying an in-plane uniaxial compression, a significant redshift of the stopband of ~62 nm is observed in the transmittance spectra (FIG. 9*c*). Again, when the stress is released, the sample returns to its original shape. As can be seen on the AFM images in FIG. 9*c*, the compression results in a decrease of spacing parallel to the crystal surface. Although, not visible in the image, the interparticle distance in the cross-section plane always increases due to the volume conservation of the individual colloidal particles.

Additionally, the stopband of a PC-G gradually blueshifts under the application of contact pressure (FIG. 9*b*). The stopband modulation (~45 nm) results in a visual colour change from green to blue when a force of 21 N is applied. This mechanochromic response of the PC-Gs is determined by the affine deformation of the particles under stress with the percentage change in stopband wavelength equal to the percentage strain. This corresponds to a sensitivity related by the initial stopband wavelength $\Delta\lambda/\varepsilon$ (%)=$\lambda_0$/100=5.2 nm/%, which is verified experimentally for the applied strain and wavelength shift above. This sensitivity is competitive with mechanochromic sensors reported in the literature and could be further increased by modifying the size of the latex particles and thereby the initial stopband position. This reversible stopband tuning of PCs can be used in a wide range of sensing applications, where a visual indication of an applied load is required.

Bending of the PC-G crystals results in a rainbow-like colour variation along the cross-section, effectively producing a microscopic 2D strain field that is related to varying degrees of particle deformation from top to bottom (FIG. 9*d*). As demonstrated in FIG. 10*a*, the PC-Gs can also be used in fingerprint detection providing a multi-channel response (with pressure and time). Resultant changes in colour reveal fingerprints with high precision. In particular, the ridges in the skin are well-defined, with the depth of the ridges also clearly distinguishable. The colour change of the PC-Gs could be detected spectroscopically, for instance a scanner disposed beneath the PC-G could record the fingerprint. Furthermore, since the PC-G takes a few seconds to return to its original shape, a check that the fingerprint has been correctly applied to the PC-G can be carried out.

The ability to tune or modulate the optical properties makes the PC-Gs attractive candidates for a wide variety of sensing applications with the output directly observable by the naked eye.

For instance, the PC-G could be used to form an item of intelligent clothing. In one example of intelligent clothing, a band comprising the PC-G could be sized to be placed around the arm of a user. When the user bent their arm this would stretch the band, giving feedback to the user. In particular, this might have applications in physiotherapy, where a colour change of the band could confirm that the user was completing their exercises correctly.

Alternatively, the PC-G could be used in insoles which could provide feedback regarding how a person walks or runs.

Example 5—Use of the PC-Gs as Shape Memory Polymers

Materials and Methods

The PC-Gs and PCs produced in example 2 were exposed to different temperatures as described below.

Determination of the Glass Transition Temperature $T_g$

The $T_g$ of the crystals was determined using a differential scanning calorimeter (DSC) (TA Instruments Q1000, New Castle, USA). Samples were deposited onto poly(tetrafluoroethylene) (PTFE) moulds by drop casting and subsequently left to dry for 48 hours at room temperature before being loaded into the DSC. A standard heating rate of 10° C./min and cooling rate of 10° C./min were used for all samples. The value of $T_g$ was taken in the first heating scan at the midpoint step-wise increase of the specific heat associated with the glass transition.

Discussion and Results

The inventors found that the crystals can also act as smart shape-memory polymers that can memorize and recover their shape and colour after experiencing an external stimulus, for example, heat. The temperature of PC-G crystals was repeatedly shifted above and below their $T_g$ value. Each time the crystal is deformed above its $T_g$, it relaxes back to the initial shape configuration at room temperature. At the same time, the stopband returns to its original value pre-deformation. This indicates that the graphene platelets are locked within the crystal lattice, where they likely inhibit particle coalescence.

For similar conditions, pristine crystals undergo irreversible particle expansion and partial coalescence leading to an irreversible shift of the stopband, or in the case of higher temperatures, a complete loss of the stopband.

Example 6—Use of the PC-Gs as Time-Temperature Indicators (TTIs) or in Jewellery The inventors have found that the PC-Gs can be used as time-temperature indicators (TTIs) for intelligent packaging. TTIs offer a visual indication of whether perishables, such as foodstuffs, pharmaceuticals, chemicals, inks, paints and coatings have experienced undesirable time-temperature histories. If the PC-Gs are not laminated or protected they will eventually dry out and the stopband will disappear. The drying rate depends on the selected drying temperature and is evidenced by a distinct colour change. When dried at room temperature, the crystals change colour from green to transparent or black depending on the crystal thickness, see FIGS. 5*b* and 5*c*.

If the crystals are immersed again in water, they are re-hydrated and the colour returns to the original green. The inventors have found that this takes 12 hours for thick crystals. As the PCs were formed close to their minimum film formation temperature (MFFT), the particle deformation is incomplete and a particle-particle interface still exists. Because of the presence of a network of pores as well as hydrophilic functional groups at the particle surfaces, the water diffusion will proceed along the interstitial sites allowing for good permeability. If the crystals are subjected to temperatures above their $T_g$ value, they act as visual TTIs that function over a broad temperature range (from RT to 100° C.). The resultant evaporation of interstitial water (decreasing the refractive index) coupled to the thermal expansion of polymer particles (increasing the lattice constant) produces a redshift of the stopband, which is extremely sensitive to even a small rise in temperature.

At higher temperatures, there is a certain cut-off point where the crystals lose their colour irreversibly with the stopband disappearing. For long exposure times above the polymer $T_g$, the diffusion of individual polymer chains across particle-particle boundaries results in irreversible and complete coalescence of the particles, which is a well-known occurrence in polymer latex films. The periodicity disappears, and thus Bragg's diffraction does not apply anymore. The loss of the stopband can be treated as a diffusion driven process where the time for the transition is defined by the time needed for the polymer chains to diffuse across the interfaces between particles. Their response is described using the Arrhenius equation 5:

$$k = Z\exp^{-\frac{E_a}{RT}} \quad \text{(eq. 5)}$$

where k is the reaction rate constant, Z is a temperature independent pre-exponential factor, $E_a$ is the activation energy describing the temperature sensitivity of the quality loss reaction, R is the universal gas constant and T is the absolute temperature in Kelvin (K).

Coalescence of particles requires the diffusion of polymer chains a distance on the order of the radius of gyration, $R_g$. The diffusion coefficient, D, is related to the distance of diffusion, x, and time, t, as:

$$D \sim \frac{\langle x^2 \rangle}{t} \sim \frac{R_g^2}{t} \quad \text{(eq. 6)}$$

The inventors note that the time for the chains to diffuse their radius of gyration is given as:

$$t \sim \frac{R_g^2}{D} \quad \text{(eq. 7)}$$

It is important for this model is the concept that diffusion is thermally activated. The diffusion coefficient is described by the Arrhenius relationship of the form:

$$D = D_0 \exp\left(\frac{-E_a}{RT}\right) \quad \text{(eq. 8)}$$

Where $E_a$ is a molar activation energy and R is the ideal gas constant. The equation tells us that diffusion is faster at higher temperatures. Substituting in for D we see:

$$t \sim \frac{R_g^2}{D_0 \exp\left(\frac{-E_a}{RT}\right)} = \frac{R_g^2}{D_0} \exp\left(\frac{E_a}{RT}\right) \quad \text{(eq. 9)}$$

Thus, if the natural logarithm of the time to achieve optical clarity and irreversible coalescence is plotted against the reciprocal temperature of the experiment, then there is a linear relationship:

$$\ln t \sim \ln\frac{R_g^2}{D_0} + \left(\frac{E}{RT}\right) \quad \text{(eq. 10)}$$

The activation energy for diffusion is obtained from the gradient, as shown in FIG. 11.

A time-temperature phase diagram (FIG. 12) shows the combinations of time and temperature at which the interfacial structural transitions occur, resulting in an associated colour change. The activation energy of PC-Gs obtained from the data in FIG. 11 is 65 kJ/mol which is similar to commercially-available TTIs indicating wide spread applicability.

Importantly, the crystals can also be encapsulated in a flexible or rigid polymer coating to modify the evaporation of the interstitial water. Accordingly, the rate of the colour change at a given temperature can be varied depending upon the desired application.

Alternatively, a polymer coating could be used to completely prevent the evaporation of the interstitial water. Accordingly, the colour of the crystal can be permanently maintained. An example of an encapsulated PC-G used for decorative purposes is shown in FIG. 10*b*.

Example 8—Use of the PC-Gs as Photonic Bandgap Waveguides

Controlled light propagation through 3D polymer based PCs has recently gained considerable interest leading to significant advances in wave-guiding structures and colloidal crystal lasers. However, the fabrication of waveguides in 3D PCs is challenging due to the complexity of the architecture, the constraints related to the processing of high-dielectric materials, and the difficulty of implementing 3D high-resolution micro-fabrication techniques.

Materials and Methods

Waveguide samples were produced by cutting a PC-G sample in two and sandwiching a layer of latex between the flat bottom faces of the samples, with the two cut edges aligned to produce a flat face. The PC-G sample was produced as described in example 2, and the latex used in the sandwich layer is composed of the same polymer as is used in the PC-G but with a 50 nm particle size. A fibre optic coupler was used to focus light from a 522 nm diode laser (LCS-T-11, Laser-compact Ltd., Russia) onto the flat face of the waveguide structure. Use of a micrometer stage allowed the laser light to be focused selectively into the PC layers or the transparent waveguiding layer. Images were captured using an Olympus e620 digital SLR camera.

Results

The inventors noted that light propagation from the 522 nm laser through both PC-G layers was prevented by the presence of a stop band. However, the light easily passed through the sandwiched layer.

Example 9—Use of the PC-Gs as Photonic Paper

The PC-Gs produced in example 2 were immersed in 1,6-hexanediamimne for a time period ranging from 10 s to 60 s. UV-vis spectroscopy was performed before and after the immersion. The inventors noted that stop band after immersion in 1,6-hexanediamimne immediately red-shifts by up to 60 nm, depending on the soaking time and crystal type.

The inventors then obtained absorption spectra as a function of time and observed the blue-shift in the stop band with time as the 1,6-hexanediamimne present in the interstitial sites evaporated with time. Spectroscopic ellipsometry on thin photonic crystal papers was performed to confirm that the paper does not swell upon exposure to 1,6-hexanediamimne. To obtain thickness values VASE ellpsometry software was used and the experimental data was fitted to a cauchy model.

Accordingly, this shows that the dopes photonic crystals of the present invention could be used as a photonic paper.

Example 10—Varying the Properties of the Photonic Crystals

Materials and Methods

The photonic crystals described in this example were prepared mutatis mutandis according to the methods described in example 2.

Results and Discussion

The inventors have found that the stopband of the PC-G and the mechanical properties of the films can be easily tuned by using different particle sizes of the polymer (FIG. 13) and different glass transition temperatures.

Additionally, in place of graphene, a broad range of 2D nanomaterials can be used. For instance, FIG. 14 shows photonic crystals comprising molybdenum disulphide ($MoS_2$) and boron nitride (BN).

Example 11—Photonic Crystals Scaffolds for Cardiac Tissue Engineering

Regenerative medicine shows promise for the treatment of a broad range of diseases and injuries but especially in areas that are notorious for poor wound healing such as the nervous, cardiovascular, and orthopedic parts of the body. For example, damage to joints is particularly difficult to repair with current therapies, due to articular cartilage being avascular. However, a potential solution is the transplantation of healthy and functional cells grown outside of the body artificially.

Meanwhile, tackling cardiovascular disease needs both greater understanding of the mechanistic workings of the heart, and efficient and effective pharmacological agents. To obtain this, we need to be able to study cellular function in detail, which requires a robust and reliable tissue model to maintain cell viability and phenotype.

It has been established that an effective scaffold for tissue engineering must imitate the cells' natural environment, or extra-cellular matrix (ECM). This maximizes cell adherence and, more importantly, ensures that the artificially produced tissue has the same characteristics as it would do in vivo.

However, forming functional, highly-optimized tissue constructs necessitates a great detail of control over the cells' local environment related to the scaffold's physical properties and architecture. This includes not only appropriate scaffold porosity but also macro-, micro- and nano-scale topographical features. However, mimicking the ECM is rarely considered at a nanoscale, which is of high importance as it is on this level the cell interacts with the substrate.

The materials commonly used to assemble the scaffold-based constructs for cardiac and cartilage tissue comprising of natural polymers such as collagen, or synthetic ones (e.g. polylactic glycolic acid (PLGA), polyurethane (PU)) can be immunogenic (provoke an immune response).

The inventors decided to investigate if their PC-Gs could be used as a scaffold for cardiac tissue engineering.

Methods

Scaffold Fabrication

The preparation of scaffolds for tissue engineering is the same as described in the Examples 1 and 2.

In the tissue culture experiments, the PC has to be hole punched into small circles so as to allow for them to fit into the well-plates, 10 mm in diameter. To make the PC more malleable it was dipped into boiling water and quickly remove and then hole punched. The newly cut out shapes were then dipped back into boiling or hot water then placed in cold water to allow the crystal to return to its original shape.

Tissue Culture Procedure

Articular chondrocytes (cartilage producing cells) were used first optimise the photonic crystal scaffolds architecture. They were sourced from explant dissections from bovine ankles.

Cytotoxicity Test

The thin films where cut to appropriate shape, 10 mm diameter circles and then bonded to a glass slide with polydimethylsiloxane (PDMS). The chondrocytes cells were seeded as 10000 cells per substrate and left to culture in 1 mL of supplemented filtered DMEM per substrate at 37° C. 5% $CO_2$. After 5 days the culture was fixed with ethanol/formaldehyde solution, as well as this half of the seeded scaffolds had the cell removed via trypsin. AFM, SEM, optical and DAPI miscopy was performed on all substrates. Plastic slips were also treated the same as the control, concurrently duplicate PC which was not seeded as for comparison.

For CM films of the PC with 0.05 wt % graphene were used, the seeding mimicked the procedure for chondrocytes.

Results

Cytotoxicity Test

After the five days, there was substantial growth in all films, with the most significant being the PC with 0.05 wt % graphene, as seen in FIG. 15. Therefore, proving for the first time that a latex-based polymer is capable of being a viable platform for the proliferation and growth of chondrocytes.

Figure 4:
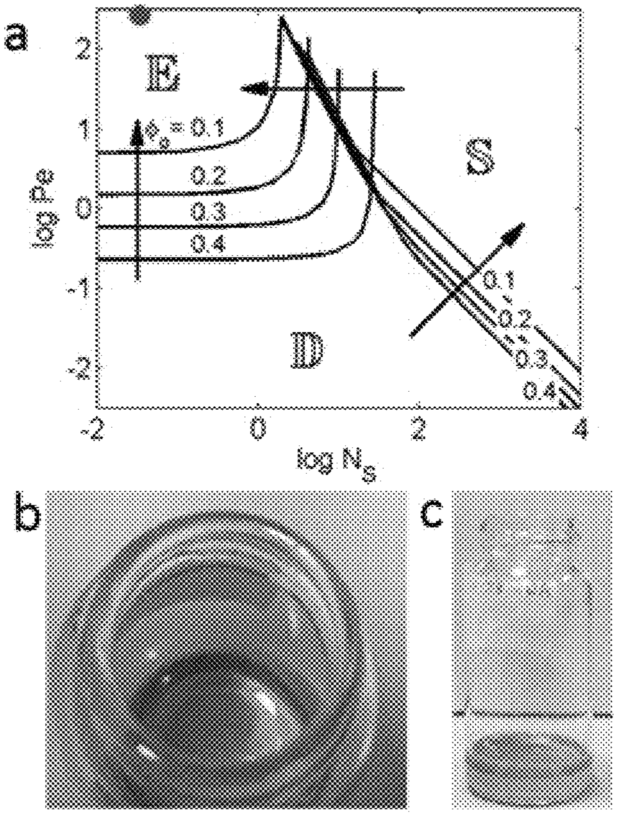

FIG. 4.6 (A.1) is an image of the dry PC with 0 wt % graphene, the dots are the chondrocytes. (A.3) shows how the cells spread out and attach with its dendrites and the pore size and roughness accommodates the integrins to anchor to the scaffold and spread out in two dimensions. There is similar coverage of cells between 0 wt % and 0.01 wt % graphene. However, the 0.01 wt % shows a greater iridescent of colours (B.1) which is useful for spectroscopic experiments.

The film with 0.05 wt % graphene has a more pronounced coverage of cells, and the deepest of colour contrast, FIG. 15 (C.1). As there is a more surface area for attachment which means the cells will adhere quicker than the other PC-scaffolds and proliferate quicker to form a confluent sheet. The greater graphene content makes it more colourful as well as more dispersive.

Plastic controls slips were kept under the same conditions to ensure reliable results, as indicated that the cells used were normal ones as they covered the plastic slips. Duplicate scaffolds were also kept under the same conditions but without the seeding of the cells as for comparison during the imaging assays, to ensure that the cells being imaged were not due to the PC being subjected to the media and incubation.

In FIG. 17, the bar chart portrays that 0.01 wt % and 0.05 wt % have the roughest surfaces, after 5 days of growth and fixing. This is following the fact they had the highest densities of cells, which means the cells preferred the graphene. Interesting to note that post the cell seeding when the cells were removed the roughness is greater than the bare films, this suggests the cells had been pulling at the surface which is flexible enough. This agrees with what is seen in FIGS. 18 to 20, as the height profiles in the AFM micrographs show localised points where there are high points when the integrins have latched on to the polymer which pulls and deforms the surface. Notice that the bare 0.01 wt % and 0.05 wt % were slightly rougher than the pristine scaffold.

Example 12—Photonic Crystals as Chemical Sensors

The inventors also investigated the ability of their PCs to act as chemical sensors.

PCs were prepared comprising molybdenum disulfide ($MoS_2$) using the methods described above.

The composite crystals were exposed to $NH_3$ aqueous solution for different times. The results are shown in FIG. 21. Upon exposure, there is a rapid colour change from dark green to a bright iridescent green explained by a significant red shift in the stop band of the crystal determined by spectroscopic ellipsometry. Moreover, the adsorption of ammonia increases the intensity of the reflection. Presumably, the change in optical properties is due to the capillary condensation of ammonia on the surface of $MoS_2$ sheets modifying the local refractive index in the crystal. As the ammonia evaporates, the stopband shifts back to the initial wavelength and intensity measured before exposure. The reaction is very quick (<1 minute) and is fully reversible. Importantly there is no response to water on its own or for a crystal that does not contain the $MoS_2$. Sensing materials are the basis of gas detection. The improved preparation techniques of 2D nanomaterials such as surface functionalization, 3D structure tailoring, formation of hybrid structures enables to achieve the highest sensitivity and selectivity of gas sensing devices, which were not possible before with existing devices on the market. Table 1 provides examples of 2D nanomaterials that have experimentally been shown (in the literature) to be selective for the particular chemical and that can be incorporated into the photonic crystals described herein for enhanced selectivity, and sensitivity of resulting PC gas sensors. It will be noted that due to their nature (e.g. as chemical warfare agents) it is not easy to test all of the analytes listed. Accordingly, where appropriate, suitable simulants are also listed which will allow testing to be conducted.

TABLE 1

2D nanomaterials which can be incorporated in a polymeric crystal to enable the resultant material to sense a target analyte

| Analyte | Simulant | Type of additive for sensing |
|---|---|---|
| Mustard gas | 2-Chloroethyl ethyl Sulphide (CEES/HM), 2-Chloroethyl methyl sulphide (CEMS) 1,2-Dichloroethane (DCE) Dimethylacetamide (DMA) thiodiglycol (TDG) | Functionalized $MoS_2$, edge-tailored GO, |
| Decomposition product of nerve agent | triethylamine (TEA) | $MoS_2$ |
| Sarin | Dimethyl-methylphosphonate (DMMP), Diphenyl chlorophospate(DPCP) | GO, edge-modified G |
| Acetone | n/a | Functionalized $WS_2$ |
| $NO_2$ | n/a | Functionalised $WS_2$, GO, UV-activated MoS2, BP, G/MoS2 hybrid |

TABLE 1-continued 2D nanomaterials which can be incorporated in a polymeric crystal to enable the resultant material to sense a target analyte

| Analyte | Simulant | Type of additive for sensing |
|---|---|---|
| $NH_3$ | n/a | $MoS_2$, fluorinated GO, functionalised $WS_2$, size-selected $WS_2$ |
| $H_2S$ | n/a | $MoS_2$, WS2, GO |
| tetrahydrofuran (THF) | n/a | $MoS_2$ |
| Nitrotoulene | n/a | $MoS_2$/CNT hybrid |
| 1,5-dichloropentane (DCP) | n/a | $MoS_2$/CNT hybrid |
| 1,4-dichlorobenzene (DCB). | n/a | $MoS_2$/CNT hybrid |
| CO | n/a | GO, $WS_2$ |
| $H_2$ | n/a | $WS_2$, Pt-decorated rGO, Pd-decorated $MoS_2$, BP, Pt-decorated G |
| ethanol | n/a | $MoS_2$/hBN hybrid |
| Chloroform | n/a | $MoS_2$/hBN hybrid |
| Toluene | n/a | $MoS_2$/hBN hybrid |
| acetonitrile | n/a | $MoS_2$/hBN hybrid |
| methanol | n/a | $MoS_2$/hBN hybrid |
| Xylene | n/a | $MoS_2$ |
| $SO_2$ | n/a | Edge-tailored GO |
| Methane | n/a | BN, pristine graphene |
| $CO_2$ | n/a | Graphene/, few-layer graphene |

List of abbreviations for listed additives:
GO—graphene oxide,
G—pristine graphene,
$MoS_2$—molibdenium disulphide,
BN—boron nitride,
$WS_2$—tungsten disulphide,
CNT—carbon nanotubes

CONCLUSIONS

The inventors' work provides the first experimental demonstration of mechanically robust, free-standing, flexible and thick synthetic opals containing pristine graphene platelets locked in a colloidal polymer crystal lattice. The inventors have found that a small addition of pristine graphene, or another 2D material, markedly increases iridescence and reduces deleterious scattering producing a strong angle-dependent structural colour and a stopband that can be reversibly shifted across the visible spectrum.

PCs fabricated using evaporation-driven self-stratification are inexpensive and have a range of applications as mechanochromic and thermochromic sensors. Importantly, this happens at significantly smaller volume fractions compared to other carbon-based fillers such as carbon black. The versatile fabrication process can employ different particle sizes and glass transition temperatures, which allows property tunability. The colour is responsive to pressure and stress, temperature and time and is fully lost when particles coalesce during exposure to high temperatures for prolonged times. These properties have applications in a variety of areas including as TTI sensors and security devices. Furthermore, the PCs can also be used as cell scaffolds or in sensing applications.

Ultimately, the inventors have developed a method that allows the assembly of a broad range of 2D nanomaterials within the photonic crystals to achieve a plethora of potential novel functionalities. Given the versatility of these crystals, this method represents a simple, inexpensive and scalable approach to produce multifunctional graphene-based synthetic opals and opens up exciting applications for novel solution-processable nanomaterial based photonics.

The invention claimed is:

1. A polymeric opal consisting of comprising:

a polymer consisting of a plurality of polymer particles defining interstitial sites between the polymer particles;

an additive disposed in the interstitial sites, the additive comprising a two-dimensional (2D) material and/or a carbon nanotube, wherein the weight ratio of the polymer to the additive is between 100:0.001 and 100:0.1;

a fluid disposed in the interstitial sites;

optionally one or more surfactants; and optionally a polymer coating.

2. The polymeric opal of claim 1, wherein the additive consists of a 2D material.

3. The polymeric opal of claim 2, wherein the 2D material comprises a plurality of 2D material particles having a mean thickness of less than 50 nm and a largest lateral dimension with a mean size of less than 30 μm and/or wherein the 2D material is selected from the group consisting of graphene, hexagonal boron nitride (h-BN) and a transition metal dichalcogenide.

4. The polymeric opal of claim 1, wherein the polymeric opal comprises a surfactant.

5. The polymeric opal of claim 4, wherein the surfactant comprises a non-ionic surfactant.

6. The polymeric opal of claim 5, wherein the non-ionic surfactant comprises

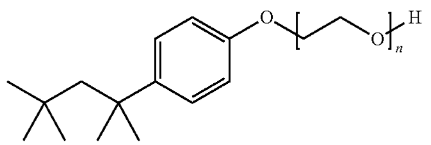

wherein n is an integer between 1 and 50, and/or a polysorbate.

7. The polymeric opal of claim 5, wherein the volumetric ratio of the polymer to the non-ionic surfactant is between 100:0.0001 and 100:2.

8. The polymeric opal of claim 1, wherein the polymer has a dry glass transition temperature (Tg) between 0° C. and 100° C.

9. The polymeric opal of claim 1, wherein the plurality of particles have an average particle size of between 50 nm and 1,000 nm.

10. The polymeric opal of claim 1, wherein the polymer comprises a carboxylic acid group.

11. The polymeric opal of claim 1, wherein the fluid is an interstitial liquid.

12. The polymeric opal of claim 11, wherein the polymeric opal comprises a polymer coating, optionally wherein the polymer coating is configured to modify the rate of evaporation of the interstitial liquid.

13. The polymeric opal of claim 11, wherein the interstitial liquid comprises between 0.5 wt % and 30 wt % of the polymeric opal.

14. The polymeric opal of claim 11, wherein the interstitial liquid comprises water, an alcohol, or an amine.

15. The polymeric opal of claim 1, wherein the polymeric opal exhibits a stopband at a wavelength between 200 nm and 1000 nm.

16. A photonic paper, an item of jewelry, a time-temperature indicator, a mechano-chromic sensor, a waveguide, a scaffold for tissue engineering, or a sensor, comprising a polymeric opal as defined in claim 1.

17. An anti-counterfeiting kit comprising a photonic paper, as defined by claim 16, and a pen comprising a solvent.

18. The polymeric opal of claim 1, wherein the two-dimensional (2D) material and/or the carbon nanotube are disposed in the interstitial sites.

19. The polymeric opal of claim 1, wherein the plurality of polymer particles are assembled in a close-packed structure.

20. The polymeric opal of claim 19, wherein the plurality of polymer particles are assembled in a hexagonal close-packed structure.

21. A method of producing the polymeric opal of claim 1, the method comprising:

providing a dispersion comprising a polymer and an additive in a solvent, wherein the additive comprises a two-dimensional (2D) material and/or a carbon nanotube and the volumetric ratio of the polymer to the additive is between 100:0.0001 and 100:0.1;

evaporating the solvent at a rate whereby evaporation of the solvent dominates over diffusion and sedimentation of the polymer and the additive to thereby form a polymeric opal.

22. The method according to claim 21, wherein evaporating the solvent at a rate whereby evaporation of the solvent dominates over diffusion and sedimentation of the polymer and the additive comprises controlling the conditions that the dispersion is exposed to such that the Peclet number (Pe) is at least 0.25 and the sedimentation number (Ns) is less than 10.

23. The method according to claim 21, wherein the dispersion is maintained at a temperature between 1° C. and 80° C. and a humidity between 5% and 99%.

24. The method according to claim 21, wherein the dispersion comprises a surfactant.

* * * * *